(12) United States Patent
Fukuda et al.

(10) Patent No.: US 10,316,960 B2
(45) Date of Patent: *Jun. 11, 2019

(54) METHOD AND DEVICE FOR CONTROLLING AUTOMATIC TRANSMISSION

(71) Applicant: Mazda Motor Corporation, Aki-gun, Hiroshima (JP)

(72) Inventors: Yutaro Fukuda, Hiroshima (JP); Manabu Sasahara, Hiroshima (JP); Tadashi Saito, Hiroshima (JP); Tomohiro Kubo, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 17 days.

This patent is subject to a terminal disclaimer.

(21) Appl. No.: 15/596,320

(22) Filed: May 16, 2017

(65) Prior Publication Data

US 2017/0335953 A1    Nov. 23, 2017

(30) Foreign Application Priority Data

May 19, 2016   (JP) ................................. 2016-100099

(51) Int. Cl.
*F16H 61/02*         (2006.01)
*F16D 25/0638*       (2006.01)
(Continued)

(52) U.S. Cl.
CPC ..... *F16H 61/0204* (2013.01); *F16D 25/0638* (2013.01); *F16D 25/10* (2013.01);
(Continued)

(58) Field of Classification Search
None
See application file for complete search history.

(56) References Cited

U.S. PATENT DOCUMENTS 5,967,285 A * 10/1999 Mohan ................ F16D 25/0638
                                                192/103 F
6,520,882 B2   2/2003 Saito
(Continued)

FOREIGN PATENT DOCUMENTS

CN       1873248 A    12/2006
CN     102164797 A     8/2011
(Continued)

*Primary Examiner* — Justin Holmes
(74) *Attorney, Agent, or Firm* — Alleman Hall Creasman & Tuttle LLP

(57) ABSTRACT

A method of controlling an automatic transmission is provided. The automatic transmission includes a piston having first and second surfaces opposite from each other, friction plates, engaging and disengaging hydraulic pressure chambers for supplying and discharging hydraulic pressure and directing the piston to push the friction plates to be engaged and disengaged, a hydraulic pressure control valve for supplying and discharging hydraulic pressure to and from the chambers, first and second oil paths communicating the valve with the chambers, and a pressure reducing valve disposed in the second oil path and for preventing hydraulic pressure of the disengaging hydraulic pressure chamber from exceeding a given set pressure. The second surface has a larger area for receiving hydraulic pressure than an area of the first surface for receiving hydraulic pressure. The method includes changing the given set pressure according to information regarding a state of the automatic transmission.

20 Claims, 18 Drawing Sheets

(51) Int. Cl.

| | |
|---|---|
| *F16D 25/10* | (2006.01) |
| *F16D 48/06* | (2006.01) |
| *F16H 61/00* | (2006.01) |
| *F16H 61/30* | (2006.01) |
| *F16H 63/30* | (2006.01) |
| *F16H 61/28* | (2006.01) |
| *F16D 48/02* | (2006.01) |
| *F16H 3/66* | (2006.01) |
| *F16H 57/10* | (2006.01) |
| *F16H 59/18* | (2006.01) |
| *F16H 59/36* | (2006.01) |
| *F16H 59/54* | (2006.01) |
| *F16H 59/70* | (2006.01) |
| *F16H 59/72* | (2006.01) |
| *F16H 3/44* | (2006.01) |
| *F16H 59/68* | (2006.01) |

(52) U.S. Cl.

CPC ........... *F16D 48/02* (2013.01); *F16D 48/062* (2013.01); *F16H 61/0021* (2013.01); *F16H 61/0206* (2013.01); *F16H 61/2807* (2013.01); *F16H 61/30* (2013.01); *F16H 63/3026* (2013.01); *F16D 2500/308* (2013.01); *F16H 3/66* (2013.01); *F16H 57/10* (2013.01); *F16H 59/18* (2013.01); *F16H 59/36* (2013.01); *F16H 59/54* (2013.01); *F16H 59/70* (2013.01); *F16H 59/72* (2013.01); *F16H 61/0251* (2013.01); *F16H 2003/442* (2013.01); *F16H 2059/683* (2013.01); *F16H 2063/303* (2013.01); *F16H 2200/006* (2013.01); *F16H 2200/2012* (2013.01); *F16H 2200/2043* (2013.01)

(56) References Cited

U.S. PATENT DOCUMENTS

| | | | |
|---|---|---|---|
| 6,599,215 | B2 | 7/2003 | Takatori et al. |
| 7,090,614 | B2 | 8/2006 | Takagi |
| 7,108,632 | B2 | 9/2006 | Takagi et al. |
| 7,384,358 | B2 | 6/2008 | Suzuki |
| 7,445,107 | B2 | 11/2008 | Kawamoto et al. |
| 7,445,572 | B2 | 11/2008 | Kodama et al. |
| 7,563,189 | B2 | 7/2009 | Inuta |
| 7,931,551 | B2 | 4/2011 | Katou et al. |
| 8,430,789 | B2 | 4/2013 | Hase et al. |
| 8,439,802 | B2 | 5/2013 | Suzuki et al. |
| 8,444,529 | B2 | 5/2013 | Katou |
| 8,726,751 | B2 | 5/2014 | Martin et al. |
| 8,788,129 | B2 | 7/2014 | Hase et al. |
| 9,062,760 | B2 | 7/2015 | Kamada et al. |
| 9,791,043 | B2 | 10/2017 | Nakashima et al. |
| 2012/0318626 | A1 | 12/2012 | Jeon |
| 2014/0297089 | A1 | 10/2014 | Tsuda et al. |
| 2015/0217773 | A1* | 8/2015 | Nakano ................. B60W 10/06 477/107 |
| 2015/0362052 | A1* | 12/2015 | Frait ....................... F16H 61/14 60/341 |
| 2016/0033032 | A1 | 2/2016 | Takagi |
| 2016/0265657 | A1* | 9/2016 | Herrmann ........... F16H 61/0206 |
| 2017/0335952 | A1* | 11/2017 | Fukuda ............... F16H 61/0206 |
| 2017/0335963 | A1* | 11/2017 | Fukuda ............... F16H 61/2807 |
| 2018/0058604 | A1 | 3/2018 | Noda et al. |

FOREIGN PATENT DOCUMENTS

| | | |
|---|---|---|
| CN | 102235486 A | 11/2011 |
| CN | 102628509 A | 8/2012 |
| CN | 102639895 A | 8/2012 |
| CN | 103477127 A | 12/2013 |
| CN | 104412009 A | 3/2015 |
| JP | S62093555 | 4/1987 |
| JP | S63045249 U | 3/1988 |
| JP | H023706 A | 1/1990 |
| JP | 04069414 A | 3/1992 |
| JP | H11153152 A | 6/1999 |
| JP | 2001336621 A | 12/2001 |
| JP | 2006071048 A | 3/2006 |
| JP | 2008249009 A | 10/2008 |
| JP | 2010190278 A | 9/2010 |
| JP | 2011033095 A | 2/2011 |
| JP | 2011218835 A | 11/2011 |
| JP | 2012171372 A | 9/2012 |
| WO | 2012144207 A1 | 10/2012 |
| WO | 2013178900 A1 | 12/2013 |

\* cited by examiner

|  | CL1 (31) | CL2 (32) | CL3 (33) | BR1 (21) | BR2 (22) |
|---|---|---|---|---|---|
| 1ST GEAR | ○ |  |  | ○ | ○ |
| 2ND GEAR |  | ○ |  | ○ | ○ |
| 3RD GEAR | ○ | ○ |  |  | ○ |
| 4TH GEAR |  | ○ | ○ |  | ○ |
| 5TH GEAR | ○ |  | ○ |  | ○ |
| 6TH GEAR | ○ | ○ | ○ |  |  |
| 7TH GEAR | ○ |  | ○ | ○ |  |
| 8TH GEAR |  | ○ | ○ | ○ |  |
| REVERSE GEAR |  |  | ○ | ○ | ○ |

FIG. 2

METHOD AND DEVICE FOR CONTROLLING AUTOMATIC TRANSMISSION

BACKGROUND

The present invention relates to a method and device for controlling an automatic transmission, and particularly relates to a method and device for controlling an automatic transmission mounted on a vehicle.

Automatic transmissions mounted on vehicles, such as automobiles, include a torque converter and a transmission gear mechanism, and automatically perform a gear shift operation by suitably setting operating states of a plurality of frictional engageable elements, such as clutches and brakes (i.e., by selecting a suitable drive force transmitting path), according to a driving condition of the vehicle.

A gear control of such an automatic transmission is required to shorten the time for completing the engagement after a gear shift command is issued and reduce an engaging shock as much as possible when switching the operating states of the frictional engageable elements from disengaged states to engaged states. For example, WO2012/144207A1 discloses a method for executing a pre-charging process when supplying hydraulic pressure to a frictional engageable element to engage the frictional engageable element. This pre-charging process quickly charges hydraulic oil in an oil path leading to the frictional engageable element from a hydraulic pressure control valve that controls the oil supply, and in a hydraulic pressure chamber of the frictional engageable element.

The pre-charging process is executed by a sharp increase of hydraulic pressure to a given value in response to the gear shift command, maintaining of the increased pressure for a given period of time, and a sharp drop of the hydraulic pressure to a given pressure thereafter.

The method of WO2012/144207A1 requires flowing hydraulic oil at a high flow rate (e.g., at the pre-charged hydraulic pressure) in order to shorten the time of the engagement control, while reducing the flow rate of hydraulic oil (drop the hydraulic pressure) immediately before the completion of one stroke of a piston in order to reduce an engaging shock. In this case, a delicate control of the flow rate is required and a hydraulic pressure control tends to become complex. Therefore, inconveniences of the engagement control being time consuming and responses of the frictional engageable elements becoming slower, arise. The slower responses of the frictional engageable elements become significantly inconvenient when attempting to further shorten the gear shifting time.

The control employing the pre-charging in the engaging operation also requires constant learning of the pre-charging time and feedbacks. For this reason, the control may become complex.

Further, since the state of the automatic transmission changes with time, an even more delicate control is required accordingly.

SUMMARY

The present invention is made in view of the above issues and aims to provide a method and device for controlling an automatic transmission, which reduce an engaging shock, shorten an engagement control time, simplify the control, and perform a delicate control corresponding to a change in a state of the automatic transmission.

According to one aspect of the present invention, a method of controlling an automatic transmission having the following structure is provided.

The automatic transmission that is the control target includes a piston, a plurality of friction plates, an engaging hydraulic pressure chamber, a disengaging hydraulic pressure chamber, a hydraulic pressure control valve, a first oil path, a second oil path, and a pressure reducing valve. The piston has a first surface and a second surface opposite from each other in axial directions of the piston, and is movable in the axial directions.

The plurality of friction plates are disposed on the first surface side of the piston. The engaging hydraulic pressure chamber supplies hydraulic pressure to the second surface of the piston and directs the piston to an engaging position to push the friction plates to be engaged with each other in an engaged state.

The disengaging hydraulic pressure chamber supplies hydraulic pressure to the first surface of the piston and directs the piston to a disengaging position to cause the friction plates to be in a disengaged state. The hydraulic pressure control valve has an output port of hydraulic pressure, and supplies and discharges hydraulic pressure to and from the engaging hydraulic pressure chamber and the disengaging hydraulic pressure chamber.

The first oil path communicates the output port of the hydraulic pressure control valve with the engaging hydraulic pressure chamber. The second oil path communicates the output port with the disengaging hydraulic pressure chamber.

The pressure reducing valve is disposed in the second oil path and for preventing hydraulic pressure of the disengaging hydraulic pressure chamber from exceeding a given set pressure.

In the automatic transmission, the second surface of the piston has a larger area for receiving hydraulic pressure than an area of the first surface for receiving hydraulic pressure.

The control method of the automatic transmission includes changing the given set pressure according to information regarding a state of the automatic transmission.

First, according to the control method of the automatic transmission as described above, in the automatic transmission that is the control target, hydraulic pressure is supplied from the output port of the hydraulic pressure control valve to the engaging hydraulic pressure chamber and the disengaging hydraulic pressure chamber through the first oil path and the second oil path, respectively. Further, there is a difference in area for receiving hydraulic pressure between the first surface and the second surface of the piston. Thus, even when the hydraulic pressure to the first surface from the engaging hydraulic pressure chamber and the hydraulic pressure to the second surface from the disengaging hydraulic pressure chamber are even, the piston is movable in the engaging direction by a pushing force according to the pressure receiving area difference which corresponds to the area of the second surface for receiving the pressure larger than the first surface. In this manner, when changing from the disengaged state to the engaged state, since the piston is moved by the pushing force corresponding to the pressure receiving area difference, an engaging shock is reduced while avoiding a complicated hydraulic pressure control that executes, for example, "the pre-charging process."

In addition, a complicated control for reducing a flow rate of hydraulic oil immediately before a completion of a piston stroke in order to reduce the engaging shock is avoided and an engagement control time is shortened.

Further, according to this aspect, since the given set pressure is changed according to the information regarding the state of the automatic transmission, a delicate control corresponding to a change in the state of the automatic transmission is performed. For example, the pushing force of the piston on the friction plates and a moving speed of the piston between the disengaging position and the engaging position are changeable according to a relative pressure difference between the engaging hydraulic pressure chamber and the disengaging hydraulic pressure chamber. Thus, the delicate control is performed by changing the given set pressure of the pressure reducing valve according to the state of the automatic transmission.

Therefore, according to the control method of the automatic transmission as described above, the engaging shock is reduced, the engagement control time is shortened, the control is simplified, and the delicate control corresponding to the change in the state of the automatic transmission is performed.

Note that the delicate control which is achieved by the control method of the automatic transmission as described above is performed, not only at the time of gear shifting, but also while traveling (driving) in a given gear range.

The information regarding the state of the automatic transmission may include information of a gear range. The given set pressure of the pressure reducing valve may be changed according to the information of the gear range. According to this configuration, for example, in a case where a high torque is applied to the friction plates in a low gear range, the given set pressure in the engaged state is changed lower so as to increase the pressure difference between the engaging hydraulic pressure chamber and the disengaging hydraulic pressure chamber. As a result, a large pushing force on the friction plates is obtained. Thus, according to the control method, a slip between the friction plates is reduced regardless of the gear range, which results in a highly efficient control.

The control method of the automatic transmission as described above may include controlling the friction plates to change from the disengaged state to the engaged state in response to a gear shift command. The controlling the friction plates may include controlling the hydraulic pressure control valve to adjust the hydraulic pressure to a first instruction pressure in a first period in response to the gear shift command, and to adjust the hydraulic pressure to a second instruction pressure in a second period directly following the first period, a change of the second instruction pressure being larger than a change of the first instruction pressure.

Here, the instruction pressure to the hydraulic pressure control valve may vary in a certain manner. Thus, each of the first and second instruction pressures is expressed by a regression line (linear regression line, curved regression line) to compare their values.

Note that "in response to the gear shift command" means "immediately after the issuance of the gear shift command," which means that another process (e.g., the pre-charging process used in the art of WO2012/144207A1) does not intervene between the issuance of the gear shift command and the start timing of the first period.

According to the control method of the automatic transmission as described above, the hydraulic pressure control valve is controlled to adjust the hydraulic pressure to the first instruction pressure which changes gentler than the second instruction pressure in a first period in response to the gear shift command. In other words, "the pre-charging process" used in the art of WO2012/144207A1 is not provided in the method. Therefore, according to the control method of the automatic transmission in this aspect, the engagement control time is shortened and the control is simplified.

In the first and second periods, the given set pressure of the pressure reducing valve may be set to a first set pressure that is higher than the first instruction pressure. After adjusting the hydraulic pressure to the second instruction pressure, the given set pressure may be changed to a second set pressure that is lower than the first set pressure. According to this configuration, since the given set pressure of the pressure reducing valve is set to the first set pressure in the first and second periods, the engaging shock is further reduced. After the end of the second period (i.e., after the completion of the engaging operation), by changing the given set pressure to the second set pressure that is lower than the first set pressure, the pressure difference between the engaging hydraulic pressure chamber and the disengaging hydraulic pressure chamber is increased. As a result, the pushing force on the friction plates is increased, and the slip between the friction plates is further reduced.

The first instruction pressure in the first period may be a given fixed value. According to this configuration, since the first instruction pressure is fixed to the certain value during the first period, the control is simplified compared to a case where the instruction pressure is changed during the first period.

The second instruction pressure may increase with time from the given fixed value at the start of the second period to a value of hydraulic pressure that causes the friction plates to be in the engaged state at the end of the second period. According to this configuration, the engaging shock is reduced more compared to a case where the instruction pressure is instantly increased from the pressure at the certain value to the hydraulic pressure. Thus, the friction plates and the like receive less damage, which results in a high reliability.

The information regarding the state of the automatic transmission may include information of an accelerator opening. The given set pressure of the pressure reducing valve may be changed according to the information of the accelerator opening. According to this configuration, in addition to the time of the gear shifting, also when the accelerator opening exceeds a given value while traveling in the given gear range, the slip of the friction plates is reduced by changing the pushing force of the piston.

The piston may be formed with a through-hole communicating the engaging hydraulic pressure chamber with the disengaging hydraulic pressure chamber. According to this configuration, since the through-hole is formed in the piston, when the pressure of the disengaging hydraulic pressure chamber increases, the hydraulic oil flows into the engaging hydraulic pressure chamber through the through-hole. Therefore, when moving the piston to the engaging position, the engaging hydraulic pressure chamber receives the hydraulic oil also from the disengaging hydraulic pressure chamber. Thus, only a small amount of hydraulic oil is required to be supplied to the engaging hydraulic pressure chamber through the first oil path.

In this manner, a responsiveness in engaging the friction plates is improved. This improvement results in that even when a clearance between the friction plates is widened in order to reduce a so-called drag resistance of the friction plates, in other words, even when the required moving distance of the piston in engaging the friction plates is increased, only a small amount of oil is required to flow into the engaging hydraulic pressure chamber from the first oil path. Thus, both the reduction in the drag resistance and the improvement in the responsiveness of the frictional engagement are achieved.

Further, a restricting mechanism for restricting an oil flow from the engaging hydraulic pressure chamber to the disengaging hydraulic pressure chamber may be disposed in the through-hole.

According to this configuration, the restricting mechanism blocks the flow of the oil from the engaging hydraulic pressure chamber to the disengaging hydraulic pressure chamber through the through-hole. For example, when pressures of the engaging hydraulic pressure chamber and the disengaging hydraulic pressure chamber are uneven in the second period, the hydraulic oil flow through the through-hole is restricted. Thus, the pushing force for the piston in the engaging direction is increased and the engagement control time is shortened.

According to another aspect of the present invention, a control device of an automatic transmission having the following structure is provided.

The automatic transmission which is the control target includes a piston, a plurality of friction plates, an engaging hydraulic pressure chamber, a disengaging hydraulic pressure chamber, a hydraulic pressure control valve, a first oil path, a second oil path, and a pressure reducing valve. The piston has a first surface and a second surface opposite from each other in axial directions of the piston, and is movable in the axial directions.

The plurality of friction plates are disposed on the first surface side of the piston. The engaging hydraulic pressure chamber supplies hydraulic pressure to the second surface of the piston and directs the piston to an engaging position to push the friction plates to be engaged with each other.

The disengaging hydraulic pressure chamber supplies hydraulic pressure to the first surface of the piston and directs the piston to a disengaging position to cause the friction plates to be a disengaged state. The hydraulic pressure control valve has an output port of hydraulic pressure, and supplies and discharges hydraulic pressure to and from the engaging hydraulic pressure chamber and the disengaging hydraulic pressure chamber.

The first oil path communicates the output port of the hydraulic pressure control valve with the engaging hydraulic pressure chamber. The second oil path communicates the output port with the disengaging hydraulic pressure chamber.

The pressure reducing valve is disposed in the second oil path and for preventing hydraulic pressure of the disengaging hydraulic pressure chamber from exceeding a given set pressure.

In the automatic transmission, the second surface has a larger area for receiving hydraulic pressure than an area of the first surface for receiving hydraulic pressure.

The control device includes a processor configured to execute instructions to change the given set pressure according to information regarding a state of the automatic transmission.

According to the control device described above, the engaging shock is reduced, the engagement control time is shortened, the control is simplified, and a delicate control corresponding to a change in a state of the automatic transmission is performed.

BRIEF DESCRIPTION OF THE DRAWINGS

FIG. 2 is an engaging combination table of frictional engageable elements of the automatic transmission.

DETAILED DESCRIPTION OF EMBODIMENTS

Hereinafter, embodiments of the present invention are described with reference to the accompanying drawings. Note that the following embodiments are merely some modes of the present invention, and the present invention is not to be limited to any parts of the following modes except for their essential structures and configurations.

Embodiment

Overall Structure of Automatic Transmission 1

Figure 1:
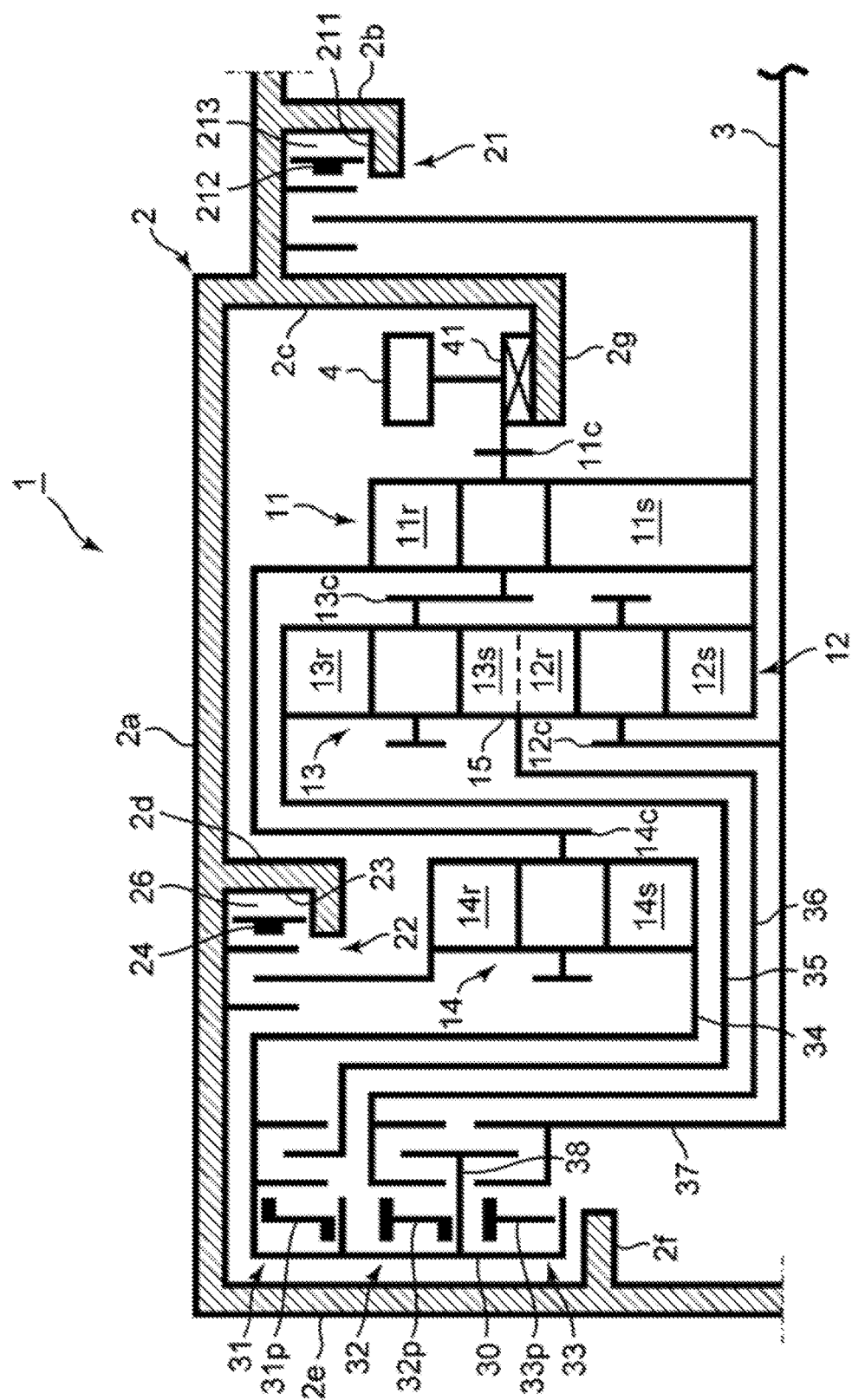
FIG. 1 is a substantial view of an automatic transmission according to one embodiment of the present invention.

FIG. 1 is a substantial view of an automatic transmission 1 for an automobile (vehicle) according to this embodiment. The automatic transmission 1 includes a transmission case 2. The automatic transmission 1 also includes an input shaft 3 extending from an engine side, and an output gear 4, four planetary gear sets (first planetary gear set 11, second planetary gear set 12, third planetary gear set 13, and fourth planetary gear set 14), two brakes (first brake 21 and second brake 22), and three clutches (first clutch 31, second clutch 32, and third clutch 33), which are disposed in the transmission case 2. The four planetary gear sets, the two brakes, and the three clutches constitute a transmission mechanism.

The input shaft 3 receives drive force generated in the engine of the vehicle. The output gear 4 outputs driving force at a given gear ratio controlled by the transmission mechanism. In this embodiment, an example in which the automatic transmission receives drive force of the engine without using a torque converter (fluid transmitter) is described.

The transmission case 2 has an outer circumferential wall 2a, a first intermediate wall 2b provided on an engine-side end part of the outer circumferential wall 2a, a second intermediate wall 2c provided on a side of the first intermediate wall 2b opposite from the engine (counter-engine side), a third intermediate wall 2d provided in an intermediate portion of the outer circumferential wall 2a in axial directions of the input shaft 3, a side wall 2e provided on a counter-engine-side end part of the outer circumferential wall 2a, a boss part 2f extending from a center part of the side wall 2e to the engine side, and a cylindrical part 2g extending from an inner circumferential end of the second intermediate wall 2c to the counter-engine side.

The four planetary gear sets 11 to 14 are disposed from the engine side in the order of the first planetary gear set 11, the second (inner circumferential) and third (outer circumferential) planetary gear sets 12 and 13 disposed overlapping with each other in radial directions of the transmission case 2, and the fourth planetary gear set 14. The first planetary gear set 11 includes a carrier 11c, a pinion (not illustrated) supported by the carrier 11c, a sun gear 11s, and a ring gear 11r. The first planetary gear set 11 is a single pinion type in which the pinion is directly meshed with the sun gear 11s and the ring gear 11r. The second to fourth planetary gear sets 12 to 14 are also a single pinion type and include carrier 12c, 13c, and 14c, pinions (not illustrated), sun gears 12s, 13s, and 14s, and ring gears 12r, 13r, and 14r, respectively.

The ring gear 12r of the second planetary gear set 12 and the sun gear 13s of the third planetary gear set 13 which are overlapped in the radial directions are integrally formed by, for example, welding or shrink-fitting. Thus, the ring gear 12r and the sun gear 13s are normally coupled to each other and form an integrated rotational element 15. The sun gear 11s of the first planetary gear set 11 is normally coupled to the sun gear 12s of the second planetary gear set 12, the ring gear 11r of the first planetary gear set 11 is normally coupled to the carrier 14c of the fourth planetary gear set 14, and the carrier 11c of the first planetary gear set 11 is normally coupled to the carrier 13c of the third planetary gear set 13. The input shaft 3 is normally coupled to the carrier 12c of the second planetary gear set 12. The output gear 4 is normally coupled to the carrier 11c of the first planetary gear set 11 and the carrier 13c of the third planetary gear set 13.

The output gear 4 is rotatably supported to the cylindrical part 2g of the transmission case 2 via a bearing 41.

The sun gear 14s of the fourth planetary gear set 14 is coupled to a first rotational member 34 extending to the counter-engine side. Similarly, the ring gear 13r of the third planetary gear set 13 is coupled to a second rotational member 35 and the integrated rotational element 15 is coupled to a third rotational member 36. These rotational members 35 and 36 also extend to the counter-engine side. The carrier 12c of the second planetary gear set 12 is coupled to a fourth rotational member 37 via the input shaft 3.

The first brake 21 is disposed on the first intermediate wall 2b of the transmission case 2. The first brake 21 includes a cylinder 211, a piston 212 fitted into the cylinder 211, and a hydraulic oil pressure chamber 213 defined by the cylinder 211 and the piston 212. When a given engaging hydraulic pressure is supplied to the hydraulic oil pressure chamber 213, a friction plate of the first brake 21 is engaged and the first brake 21 fixes the sun gear 11s of the first planetary gear set 11 and the sun gear 12s of the second planetary gear set 12 to the transmission case 2.

The second brake 22 is disposed on the third intermediate wall 2d. The second brake 22 includes a cylinder 23, a piston 24 fitted into the cylinder 23, and an engaging hydraulic pressure chamber 26 defined by the cylinder 23 and the piston 24. When a given engaging hydraulic pressure is supplied to the engaging hydraulic pressure chamber 26, the friction plate of the second brake 22 is engaged and the second brake 22 fixes the ring gear 14r of the fourth planetary gear set 14 to the transmission case 2. In this embodiment, an example of applying the frictional engageable element provided with features of the present invention to the second brake 22 is described. This second brake 22 is described later in detail with reference to FIGS. 3 to 11.

The first to third clutches 31 to 33 are disposed in a counter-engine-side end section inside the transmission case 2. The first to third clutches 31 to 33 are overlapped with each other in the radial directions so that the second clutch 32 is located on the inner circumferential side of the first clutch 31 and the third clutch 33 is located on the inner circumferential side of the second clutch 32 at the same position in the axial directions.

The first clutch 31 disconnects the sun gear 14s of the fourth planetary gear set 14 from the ring gear 13r of the third planetary gear set 13. In other words, the first clutch 31 switches the connection state between the first rotational member 34 coupled to the sun gear 14s and the second rotational member 35 coupled to the ring gear 13r.

The second clutch 32 disconnects the sun gear 14s of the fourth planetary gear set 14 from the integrated rotational element 15 (i.e., the ring gear 12r of the second planetary gear set 12 and the sun gear 13s of the third planetary gear set 13). In other words, the second clutch 32 switches the connection state between the first rotational member 34 coupled to the sun gear 14s and the third rotational member 36 coupled to the integrated rotational element 15.

The third clutch 33 disconnects the sun gear 14s of the fourth planetary gear set 14 from the input shaft 3 and the carrier 12c of the second planetary gear set 12. In other words, the third clutch 33 switches the connection state between the first rotational member 34 coupled to the sun gear 14s and the fourth rotational member 37 coupled to the carrier 12c via the input shaft 3.

The first rotational member 34 is switched in the connection state with the second rotational member 35 by the first clutch 31, switched in the connection state with the third rotational member 36 by the second clutch 32, and switched in the connection state with the fourth rotational member 37 by the third clutch 33. Thus, the first rotational member 34 is commonly used as one of each pair of rotational members of which the connection state is switched by one of the first to third clutches 31 to 33. Therefore, a common rotational member 30 having a wall perpendicular to the axis of the input shaft 3 is disposed near the side wall 2e of the transmission case 2, on the counter-engine side of the first to third clutches 31 to 33. Further, the first rotational member 34 is coupled to the common rotational member 34.

The common rotational member 30 is commonly used by the first to third clutches 31 to 33 and supports cylinders, pistons, hydraulic oil pressure chambers, hydraulic oil paths, centrifugal balance hydraulic pressure chambers, centrifugal balance chamber components, etc. of the first to third clutches 31 to 33. FIG. 1 illustrates pistons 31p, 32p, and 33p of the first to third clutches 31 to 33 in a simplified manner. Note that a common member 38 is attached to the second and third clutches 32 and 33 to hold friction plates thereof.

As described above, the automatic transmission 1 of this embodiment includes the transmission mechanism having the first to fourth planetary gear sets 11 to 14, and the first and second brakes 21 and 22 and the first to third clutches 31 to 33 (five frictional engageable elements), and for changing the gear ratio between the input shaft 3 and the output gear 4. FIG. 2 is an engaging combination table of the five frictional engageable elements of the automatic transmission 1. As indicated in the engaging combination table of FIG. 2, three of the five frictional engageable elements are selectively engaged (○ marks) to realize first to eighth forward gear ranges and a reverse gear range. In FIG. 2, "CL1," "CL2," and "CL3" indicate the first to third clutches 31 to 33, respectively, and "BR1" and "BR2" indicate the first and second brakes 21 and 22, respectively.

Details of Frictional Engageable Element

Figure 3:
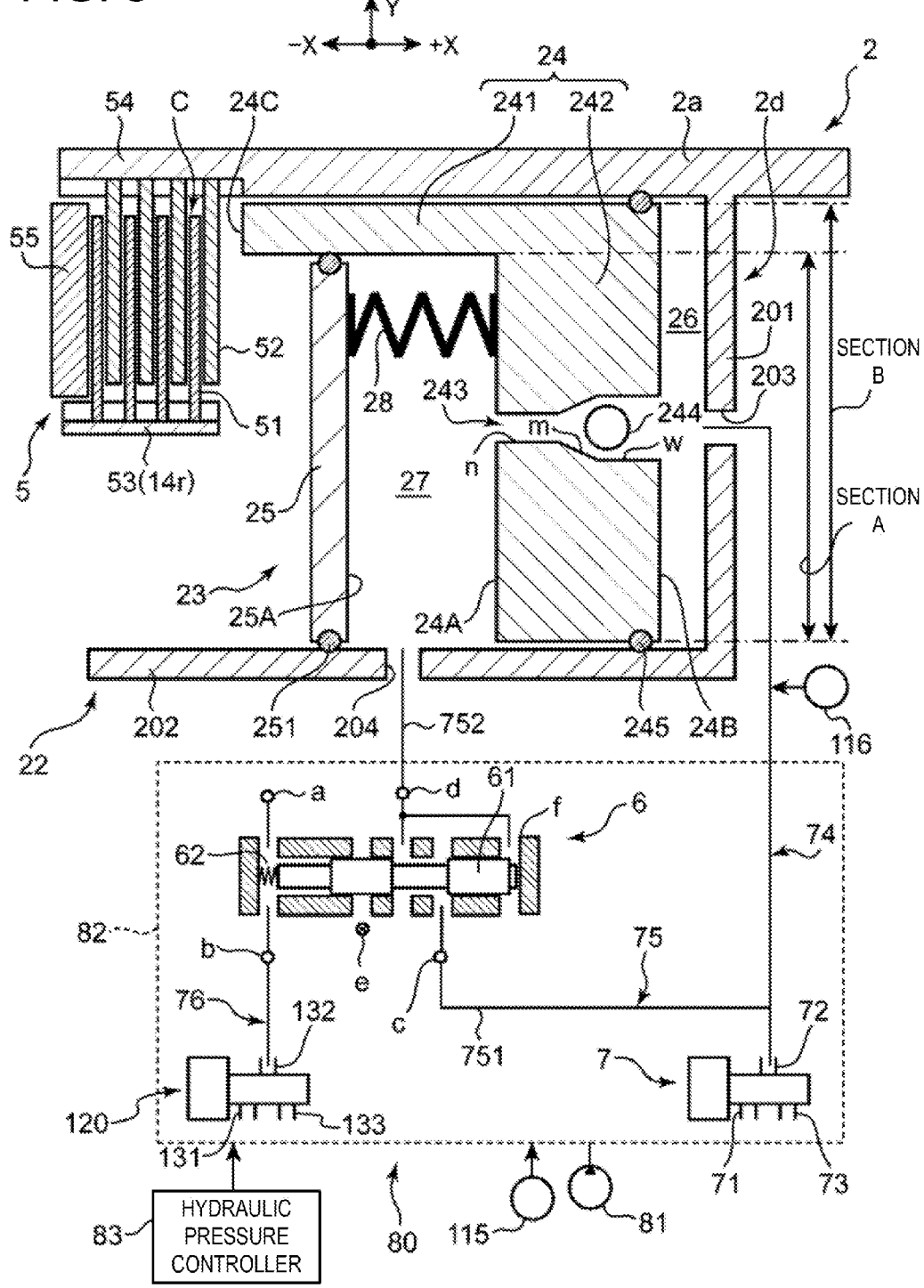
FIG. 3 is a view illustrating a schematic cross section of a structure of a second brake which is one of the frictional engageable elements, and illustrating a configuration of a hydraulic mechanism of the second brake, according to the embodiment.

FIG. 3 is a view illustrating a schematic cross section of a structure of one of the frictional engageable elements of the automatic transmission 1 and illustrating a configuration of a hydraulic mechanism 80 of the frictional engageable element. Here, the second brake 22 is illustrated in FIG. 3. In FIGS. 3 and 7 to 11, the axial directions of the input shaft 3 are indicated as X directions and the radial directions of the automatic transmission 1 are indicated as Y directions. Further, for the sake of convenience, the left side of the drawings in the X directions is indicated as the −X direction and the right side of the drawings in the X directions is indicated as the +X direction.

The second brake 22 is disposed in the cylinder 23 formed by the third intermediate wall 2d as described above, and includes the piston 24, a sealing ring 25, the engaging hydraulic pressure chamber 26, a disengaging hydraulic pressure chamber 27, a return spring 28, and a friction plate unit 5 (a plurality of friction plates). The hydraulic mechanism 80 is attached to the second brake 22. The hydraulic mechanism 80 includes an oil pump 81, a hydraulic circuit 82, and a hydraulic pressure controller 83 for controlling the oil pump 81 and the hydraulic circuit 82. The hydraulic circuit 82 includes a pressure reducing valve 6, a linear solenoid valve 7 (hydraulic pressure control valve), and a linear solenoid valve 120 (release pressure control valve). Further to the hydraulic circuit 82, an oil temperature sensor 115 is attached. This oil temperature sensor 115 is provided in an oil pan of the automatic transmission 1, for example.

The third intermediate wall 2d is formed by a first wall portion 201 extending radially inwardly from the outer circumferential wall 2a of the transmission case 2, and a second wall portion 202 extending axially (in the −X direction) from a radially inner edge of the first wall portion 201. The outer circumferential wall 2a and the second wall portion 202 oppose to each other in the radial directions with a given gap therebetween. A space formed by the outer circumferential wall 2a and the first and second wall portions 201 and 202 is the space of the cylinder 23 for the second brake 22. The first wall portion 201 is formed with a first supply port 203 for supplying hydraulic pressure to the engaging hydraulic pressure chamber 26. The second wall portion 202 is formed with a second supply port 204 for supplying hydraulic pressure to the disengaging hydraulic pressure chamber 27.

The piston 24 has a first surface 24A and a second surface 24B axially opposite from each other and is axially movable in the space between the outer circumferential wall 2a and the second wall portion 202 (inside the cylinder 23). The first surface 24A faces the disengaging hydraulic pressure chamber 27 and the second surface 24B faces the engaging hydraulic pressure chamber 26. The piston 24 moves between a disengaging position at which the friction plate unit 5 is in a disengaged state (e.g., the position illustrated in FIG. 7) and an engaging position at which the piston 24 pushes the friction plate unit 5 to be in an engaged state (the position illustrated in FIGS. 10 and 11).

The piston 24 includes a pushing piece 241 disposed adjacently to the outer circumferential wall 2a, and a pressure receiving piece 242 for sliding on an inner circumferential surface of the outer circumferential wall 2a and an outer circumferential surface of the second wall portion 202. The pressure receiving piece 242 is bored a through-hole 243 axially penetrating the pressure receiving piece 242. Further, sealing members 245 are fitted into inner and outer circumferential surfaces of the pressure receiving piece 242.

The pushing piece 241 projects in the −X direction from the pressure receiving piece 242, and includes, at a tip end in a pushing direction (in the −X direction), a tip end surface 24C for applying a pushing force to the friction plate unit 5. The pressure receiving piece 242 is a separator between the engaging hydraulic pressure chamber 26 and the disengaging hydraulic pressure chamber 27. Note that in this embodiment, the engaging hydraulic pressure chamber 26 may be communicated with the disengaging hydraulic pressure chamber 27 by the through-hole 243. The sealing members 245 are for sealing between the inner circumferential surface of the pressure receiving piece 242 and the outer circumferential surface of the second wall portion 202 and sealing between the outer circumferential surface of the pressure receiving piece 242 and the inner circumferential surface of the outer circumferential wall 2a, while allowing the axial movement of the piston 24.

The through-hole 243 is a cylindrical hole having different diameters in the axial directions, and has a larger diameter section w, a smaller diameter section n, and an intermediate section m therebetween. The larger diameter section w is formed on the second surface 24B side, i.e., the engaging hydraulic pressure chamber 26 side. The smaller diameter section n is formed on the first surface 24A side, i.e., the disengaging hydraulic pressure chamber 27 side. The intermediate section m is gradually tapered from the larger diameter section w to the smaller diameter section n.

A pressure ball 244 (restricting mechanism) for restricting a flow of hydraulic oil from the engaging hydraulic pressure chamber 26 to the disengaging hydraulic pressure chamber 27 is disposed inside the through-hole 243. A diameter of the pressure ball 244 is smaller than a diameter of the larger diameter section w and larger than a diameter of the smaller diameter section n. When the hydraulic pressure of the disengaging hydraulic pressure chamber 27 is higher than that of the engaging hydraulic pressure chamber 26, the pressure ball 244 floats within the larger diameter section w and does not restrict the flow of the hydraulic oil between the engaging hydraulic pressure chamber 26 and the disengaging hydraulic pressure chamber 27.

On the other hand, when the hydraulic pressure inside the engaging hydraulic pressure chamber 26 is higher than that of the disengaging hydraulic pressure chamber 27, the pressure ball 244 is stopped at the intermediate section m to block the through-hole 243, and restricts the flow of the hydraulic oil between the engaging hydraulic pressure chamber 26 and the disengaging hydraulic pressure chamber 27.

The sealing ring 25 is a flat plate member having an annular shape and disposed on the first surface 24A side of the piston 24 to oppose to the pressure receiving piece 242. The sealing ring 25 is disposed between the pushing piece 241 of the piston 24 and the second wall portion 202, and forms the disengaging hydraulic pressure chamber 27 together with the pushing piece 241 of the piston 24 and the second wall portion 202. Sealing members 251 are attached to inner and outer circumferential surfaces of the sealing ring 25. The sealing members 251 are for sealing between an outer circumferential edge of the sealing ring 25 and an inner circumferential surface of the pushing piece 241 and sealing between an inner circumferential edge of the sealing ring 25 and the outer circumferential surface of the second wall portion 202.

The engaging hydraulic pressure chamber 26 is space where hydraulic pressure for moving the piston 24 to the engaging position (in the −X direction) is supplied. The engaging hydraulic pressure chamber 26 is defined by the first and second wall portions 201 and 202, the outer circumferential wall 2a, and the second surface 24B of the piston 24. In other words, the engaging hydraulic pressure chamber 26 hydraulically applies the second surface 24B a pushing force to move the piston 24 to the engaging position at which the friction plate unit 5 is pushed to become the engaged state (friction plates are engaged with each other).

The disengaging hydraulic pressure chamber 27 is space where hydraulic pressure for moving the piston 24 to the disengaging position (in the +X direction) is supplied. The disengaging hydraulic pressure chamber 27 is defined by the second wall portion 202, the pushing piece 241 of the piston 24, a +X-side surface 25A of the sealing ring 25, and the first surface 24A of the piston 24. In other words, the disengaging hydraulic pressure chamber 27 hydraulically applies the first surface 24A the pushing force to move the piston 24 to the disengaging position at which the friction plate unit 5 is pushed to become the disengaged state. The return spring 28 for elastically biasing the piston in the +X direction is disposed inside this disengaging hydraulic pressure chamber 27. When hydraulic pressure is not supplied to the engaging hydraulic pressure chamber 26, the return spring 28 moves (returns) the piston 24 in the +X direction.

Here, a pressure receiving area of the second surface 24B is set larger than that of the first surface 24A. Hereinafter, a section of the first surface 24A where hydraulic pressure is received from the disengaging hydraulic pressure chamber 27, i.e., the pressure receiving area of the first surface 24A, is referred to as the section A (schematically indicated as "SECTION A" in FIG. 3). Further, a section of the second surface 24B where hydraulic pressure is received from the engaging hydraulic pressure chamber 26, i.e., the pressure receiving area of the second surface 24B, is referred to as the section B (schematically indicated as "SECTION B" in FIG. 3). In this embodiment, the relationship between these pressure receiving areas is SECTION B>SECTION A.

Such a difference in pressure receiving area between the sections A and B allows the piston 24 to move based on the difference. For example, if the engaging hydraulic pressure chamber 26 and the disengaging hydraulic pressure chamber 27 are supplied the same level of hydraulic pressure, the hydraulic pressure is received at the first and second surfaces 24A and 24B. In this case, since the pressure receiving area of the second surface 24B is larger than the pressure receiving area of the first surface 24A, a pushing force in the −X direction, corresponding to the pressure receiving area difference, acts on the piston 24. Since the piston 24 is bored the through-hole 243, upon the action of the pushing force in the −X direction, the hydraulic oil inside the disengaging hydraulic pressure chamber 27 flows into the engaging hydraulic pressure chamber 26 through the through-hole 243. Thus, the piston 24 moves in the −X direction. In other words, the hydraulic pressures in the engaging hydraulic pressure chamber 26 and the disengaging hydraulic pressure chamber 27 become even, and then the piston 24 is moved in the −X direction by the pushing force corresponding to the pressure receiving area difference.

The friction plate unit 5 includes a plurality of friction plates disposed by leaving clearances therebetween and is disposed on the first surface 24A side of the piston 24. For example, the friction plate unit 5 is comprised of a plurality of drive plates 51 and a plurality of driven plates 52 which are alternately arranged by leaving a given clearance C. Facings are adhered to both surfaces of each drive plate 51. The drive plates 51 are spline coupled to a first spline part 53, and the driven plates 52 are spline coupled to a second spline part 54. The first spline part 53 corresponds to an outer circumferential part of the ring gear 14r of the fourth planetary gear set 14 illustrated in FIG. 1. The second spline part 54 is provided to a part of the outer circumferential wall 2a of the transmission case 2.

The tip end surface 24C of the piston 24 contacts with one of the driven plates 52 which is located on the most +X side and applies the pushing force to the friction plate unit 5. A retaining plate 55 is disposed adjacently to one of the drive plates 51 which is located on the most −X side. The retaining plate 55 restricts movements of the drive plates 51 and the driven plates 52 in the −X direction.

The hydraulic mechanism 80 supplies and discharges a given level of hydraulic pressure to and from the frictional engageable element (the second brake 22 in FIG. 3) of the automatic transmission 1. The oil pump 81 of the hydraulic mechanism 80 is driven by the engine to flow hydraulic oil to a required part(s) and generates a given hydraulic pressure. The hydraulic circuit 82 is provided to each of the first and second brakes 21 and 22 and the first to third clutches 31 to 33 (frictional engageable elements), and selectively supplies hydraulic pressure to the frictional engageable elements to realize the respective gear ranges illustrated in FIG. 2. FIG. 3 only illustrates the pressure reducing valve 6, the linear solenoid valve 7, and the linear solenoid valve 120 of the hydraulic mechanism 80 which perform the supply and discharge of the hydraulic pressure to and from the second brake 22.

The linear solenoid valve 7 is a hydraulic pressure control valve for supplying and discharging hydraulic pressure to and from each of the engaging hydraulic pressure chamber 26 and the disengaging hydraulic pressure chamber 27. The linear solenoid valve 7 includes an input port 71 for receiving hydraulic oil from the oil pump 81, an output port 72 for outputting the hydraulic oil (hydraulic pressure), a drain port 73 for discharging the hydraulic oil, and a spool (not illustrated) which operates in response to a power distribution to a coil thereof. The operation of the spool causes the input and output ports 71 and 72 to communicate with each other when supplying the hydraulic pressure to the engaging hydraulic pressure chamber 26 and the disengaging hydraulic pressure chamber 27, and causes the output port 72 and the drain port 73 to communicate with each other when discharging the hydraulic pressure. The linear solenoid valve 7 adjusts an amount of oil discharged from the output port 72 based on a control of the power distribution amount to the coil.

The hydraulic circuit 82 includes a first oil path 74 for communicating the linear solenoid valve 7 with the engaging hydraulic pressure chamber 26, and a second oil path 75 for communicating the linear solenoid valve 7 with the disengaging hydraulic pressure chamber 27. For example, an upstream end of the first oil path 74 is connected to the output port 72 and a downstream end of the first oil path 74 is connected to the first supply port 203 communicating with the engaging hydraulic pressure chamber 26. An upstream end of the second oil path 75 is connected to the output port 72 and a downstream end of the second oil path 75 is connected to the second supply port 204 communicating with the disengaging hydraulic pressure chamber 27. Thus, both of the first and second oil paths 74 and 75 receive the oil from the same output port 72 of the linear solenoid valve 7 instead of receiving it through different hydraulic supply paths.

Note that a hydraulic pressure sensor 116 for detecting pressure of the hydraulic oil (hydraulic pressure) is attached to the first oil path 74. Thus, an actual pressure of the hydraulic oil inside the first oil path 74 is measured by this hydraulic pressure sensor 116.

The second oil path 75 is divided into an upstream oil path 751 and a downstream oil path 752 by the pressure reducing valve 6. When causing the friction plate unit 5 to change from the disengaged state to the engaged state, hydraulic pressure is supplied to the engaging hydraulic pressure chamber 26 and the disengaging hydraulic pressure chamber 27 simultaneously from the output port 72 of the linear solenoid valve 7 through the first and second oil paths 74 and 75.

The pressure reducing valve 6 is built in the second oil path 75 and adjusts the hydraulic pressure of the disengaging hydraulic pressure chamber 27 to be at or below a given value (a set pressure of the pressure reducing valve 6). The pressure reducing valve 6 includes a plurality of ports a, b, c, d, e and f, and a spool 61 for switching ports among the plurality of ports. The ports "a" and "b" communicate with a spring chamber accommodating a return spring 62 for elastically biasing the spool 61 in the +X direction. The port "c" is an input port and the port "d" is an output port. The input port c is connected to a downstream end of the upstream oil path 751 of the second oil path 75. The output port d is connected to an upstream end of the downstream oil path 752, and thus the output port d is connected with the second supply port 204.

The port "e" is a drain port and the port "f" is a feedback port. When the biasing force of the return spring 62 is superior to (higher than) hydraulic pressure supplied to the feedback port f, the input and output ports c and d communicate with each other. Thus, the upstream and downstream oil paths 751 and 752 communicate with each other, which allows the hydraulic pressure to be supplied to the disengaging hydraulic pressure chamber 27.

On the other hand, when hydraulic pressure which overtakes the biasing force of the return spring 26 is supplied to the feedback port f, the hydraulic pressure moves the spool 61 in the −X direction and the output port d and the drain port e communicate with each other, which allows the hydraulic pressure to be discharged from the disengaging hydraulic pressure chamber 27. In other words, when the hydraulic pressure of the disengaging hydraulic pressure chamber 27 becomes high, the hydraulic pressure supplied to the pressure reducing valve 6 from the feedback port f also becomes high, the spool 61 is operated to communicate the output port d with the drain port e, and the disengaging hydraulic pressure chamber 27 is depressurized. When the biasing force of the return spring 62 becomes superior accordingly, the spool 61 resumes to communicate the input port c with the output port d, which allows the hydraulic pressure to be supplied to the disengaging hydraulic pressure chamber 27.

The linear solenoid valve 120 is a hydraulic pressure control valve connected to the port b of the pressure reducing valve 6 via a third oil path 76, and supplies and discharges hydraulic pressure to and from the spring chamber. Thus, the linear solenoid valve 120 functions as a set pressure (release pressure) control valve for changing a set pressure (release pressure) of the pressure reducing valve 6.

The linear solenoid valve 120 includes an input port 131 into which hydraulic oil is introduced from the oil pump 81, an output port 132 for outputting hydraulic oil (hydraulic pressure), a drain port 133 for discharging hydraulic oil, and a spool (not illustrated) which operates in response to a power distribution to a coil. The operation of the spool causes the input and output ports 131 and 132 to communicate with each other when supplying the hydraulic pressure to the spring chamber of the pressure reducing valve 6, and causes the output port 132 and the drain port 133 to communicate with each other when discharging the hydraulic pressure. The linear solenoid valve 120 adjusts an amount of oil discharged from the output port 132 based on a control of the power distribution amount to the coil.

The hydraulic pressure controller 83 controls the hydraulic pressures supplied to the engaging hydraulic pressure chamber 26 and the disengaging hydraulic pressure chamber 27 and also the hydraulic pressure inside the spring chamber of the pressure reducing valve 6 by controlling the operations of the solenoids of the linear solenoid valves 7 and 120. The hydraulic pressure controller 83 also controls the linear solenoid valves connected to the other frictional engageable elements, and thus controls hydraulic pressures supplied to the first brake 21 and the first to third clutches 31 to 33.

Control System Configuration of Automatic Transmission 1

Figure 4:
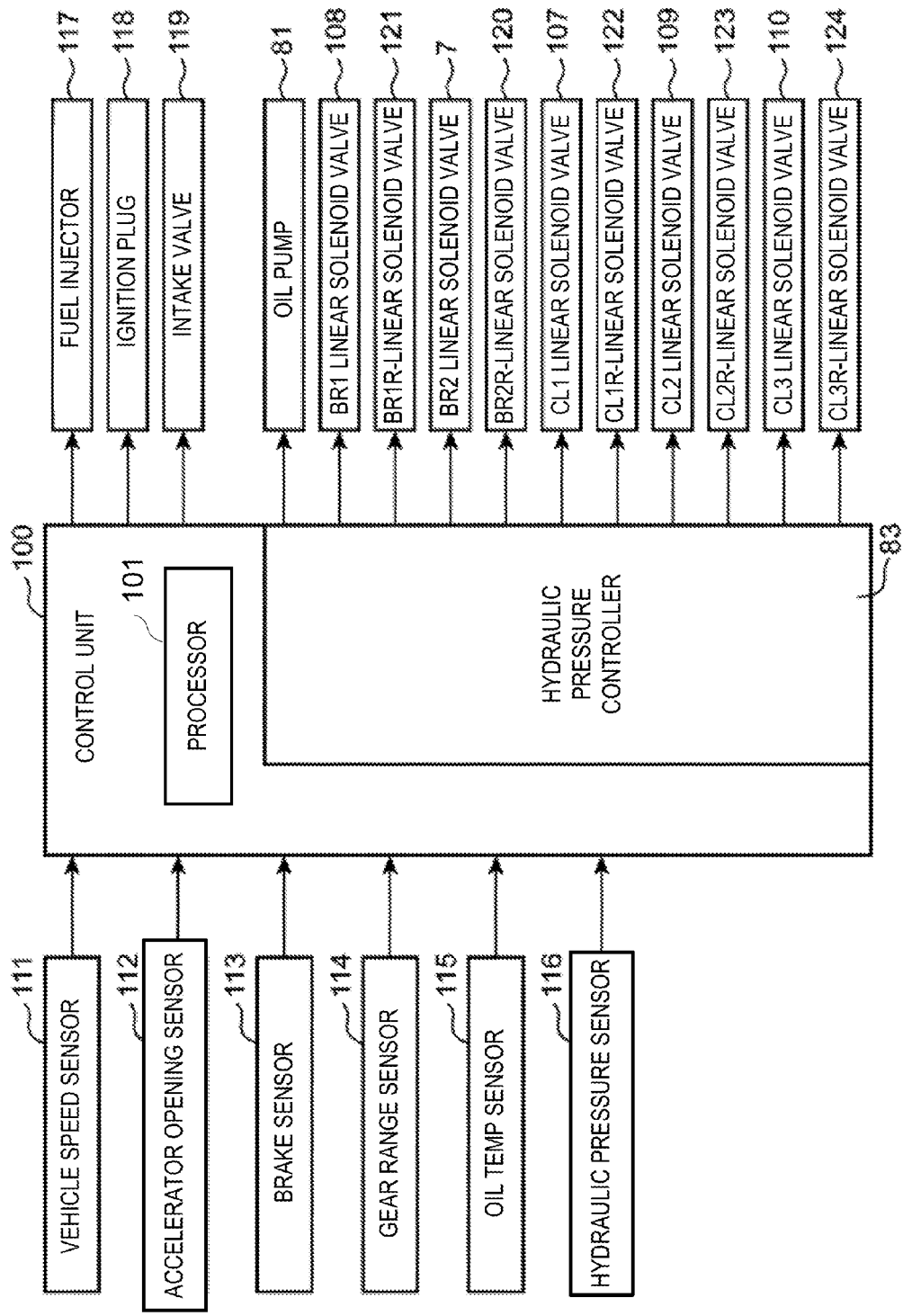
FIG. 4 is a block diagram schematically illustrating a control system configuration of the automatic transmission of the embodiment.

A control system configuration of the automatic transmission 1 of this embodiment is described with reference to FIG. 4 which is a block diagram schematically illustrating the control system configuration. In FIG. 4, the linear solenoid valve connected to an engaging hydraulic pressure chamber and a disengaging hydraulic pressure chamber of the first brake 21 is indicated as "BR1 LINEAR SOLENOID VALVE 108."

Similarly, the linear solenoid valve connected to the engaging hydraulic pressure chamber and the disengaging hydraulic pressure chamber of the second brake 22 is indicated as "BR2 LINEAR SOLENOID VALVE 7," the linear solenoid valve connected to an engaging hydraulic pressure chamber and a disengaging hydraulic pressure chamber of the first clutch 31 is indicated as "CL1 LINEAR SOLENOID VALVE 107," a linear solenoid valve connected to an engaging hydraulic pressure chamber and a disengaging hydraulic pressure chamber of the second clutch 32 is indicated as "CL2 LINEAR SOLENOID VALVE 109," and a linear solenoid valve connected to an engaging hydraulic pressure chamber and a disengaging hydraulic pressure chamber of the third clutch 33 is indicated as "CL3 LINEAR SOLENOID VALVE 110."

Further, a linear solenoid valve connected to a pressure reducing valve of the first brake 21 is indicated as "BR1R-LINEAR SOLENOID VALVE 121," the linear solenoid valve connected to the pressure reducing valve 6 of the second brake 22 is indicated as "BR2R-LINEAR SOLENOID VALVE 120," a linear solenoid valve connected to a pressure reducing valve of the first clutch 31 is indicated as "CL1R-LINEAR SOLENOID VALVE 122," a linear solenoid valve connected to a pressure reducing valve of the second clutch 32 is indicated as "CL2R-LINEAR SOLENOID VALVE 123," and a linear solenoid valve connected to a pressure reducing valve of the third clutch 33 is indicated as "CL3R-LINEAR SOLENOID VALVE 124."

As illustrated in FIG. 4, a control unit 100 which is the control device of the vehicle in this embodiment receives various information from the vehicle, such as vehicle speed information detected by a vehicle speed sensor 111, accelerator opening information detected by an accelerator opening sensor 112, brake information detected by a brake sensor 113, gear range (gear shift) information detected by a gear range sensor 114, oil temperature information detected by an oil temperature sensor 115, and the actual pressure (measured hydraulic pressure) information detected by the hydraulic pressure sensor 116.

The control unit 100 performs calculations based on the received various information and transmits control signals to a fuel injector 117, an ignition plug 118, and an intake valve 119. The control unit 100 includes the hydraulic pressure controller 83 and a processor 101 configured to execute instructions to send and receive signals, and the hydraulic pressure controller 83 outputs control signals to the oil pumps 81, the BR1 linear solenoid valve 108, the BR2 linear solenoid valve 7, the CL1 linear solenoid valve 107, the CL2 linear solenoid valve 109, and the CL3 linear solenoid valve 110. The hydraulic pressure controller 83 may have a separate processor or may utilize the processor 101 as an integrated part of the control unit 100.

Further, the hydraulic pressure controller 83 outputs control signals to the BR1R-linear solenoid valve 121, the BR2R-linear solenoid valve 120, the CL1R-linear solenoid valve 122, the CL2R-linear solenoid valve 123, and the CL3R-linear solenoid valve 124.

Note that the control unit 100 stores a given gear shift map (not illustrated). The gear shift map has the vehicle speed and the accelerator opening as parameters and is designed to have a plurality of ranges for obtaining a suitable gear range according to these vehicle speed and accelerator opening.

Hydraulic Pressure Control Executed by Control Unit 100

Figure 5:
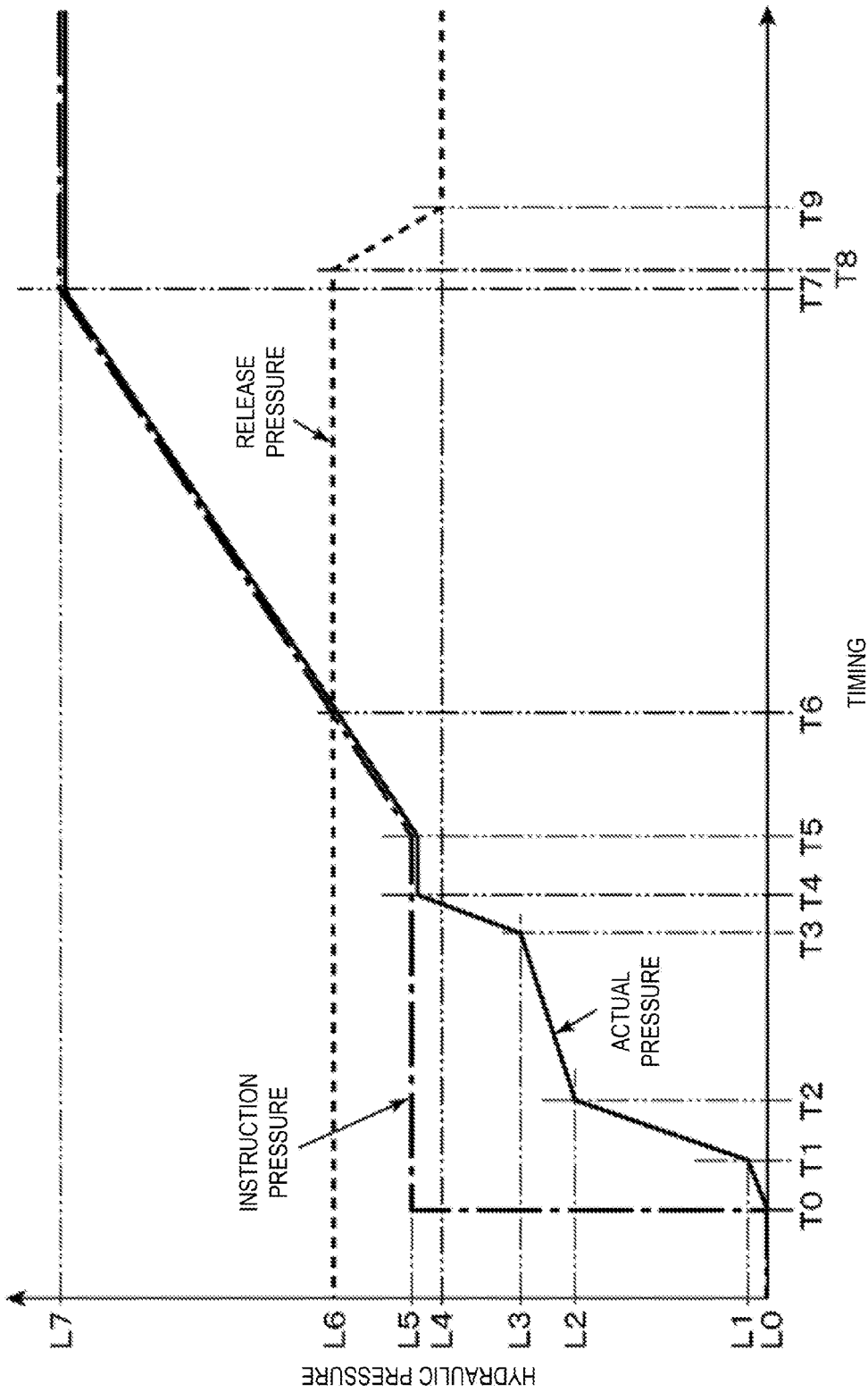
FIG. 5 is a time chart of a hydraulic pressure control executed by a hydraulic pressure controller to engage the second brake of the automatic transmission 1.
Figure 6:
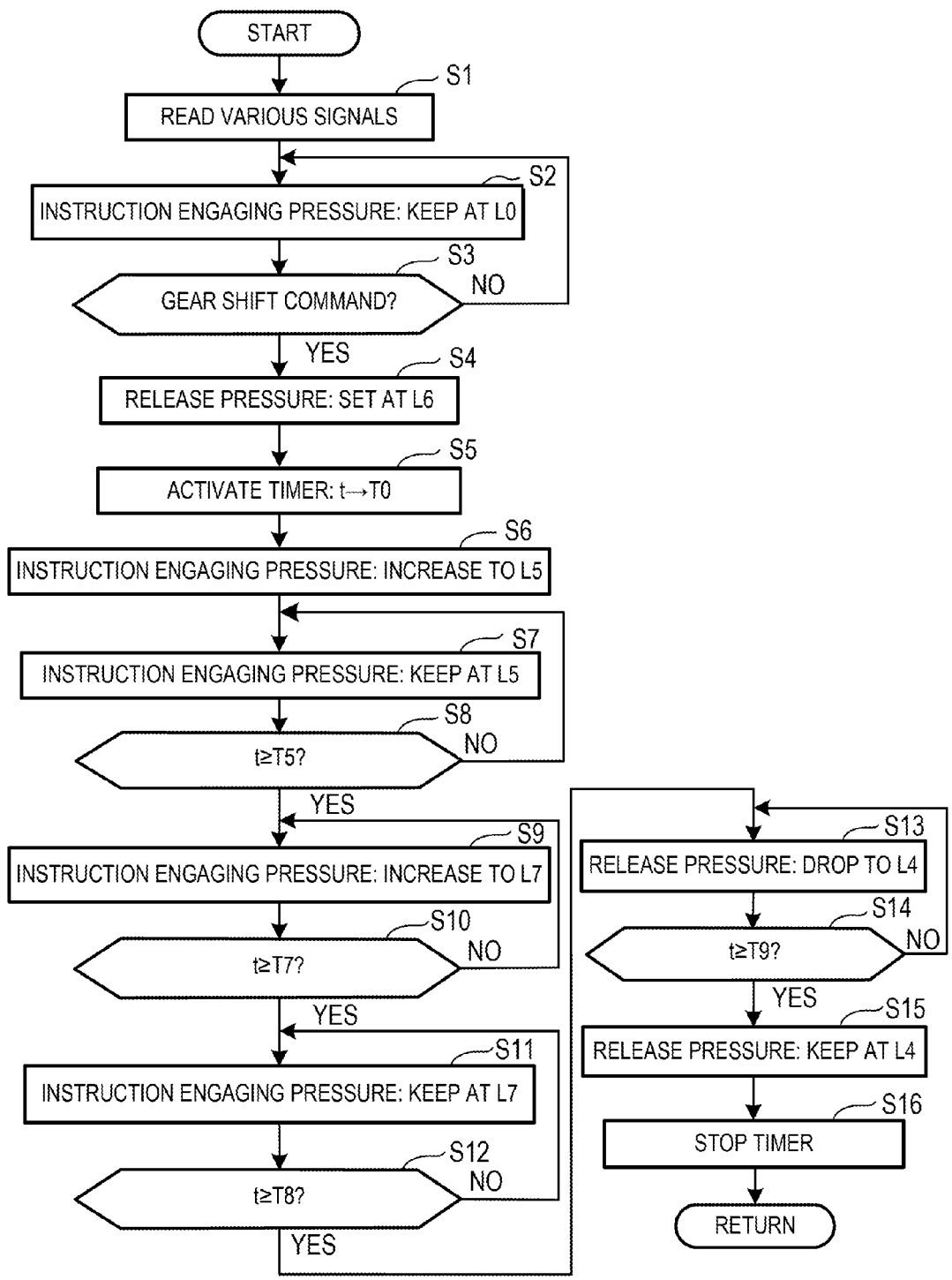
FIG. 6 is a flowchart illustrating a control in a gear shift operation of the automatic transmission.

A hydraulic pressure control executed by the control unit 100 is described with reference to FIGS. 5 and 6. FIG. 5 is a time chart of the hydraulic pressure control executed by the hydraulic pressure controller 83 of the control unit 100 to engage the second brake 22 of the automatic transmission 1. FIG. 6 is a flowchart illustrating a hydraulic pressure control operation performed by the control unit 100 of the automatic transmission 1.

First, the control unit 100 reads various signals (S1). The read signals include the vehicle speed information, the accelerator opening information, the brake information, the gear range (gear shift) information, the oil temperature information, and the hydraulic pressure information. Here, the hydraulic pressure controller 83 instructs the linear solenoid valve 7 to keep the hydraulic pressure (engaging pressure) at a hydraulic pressure level L0, in other words, keep the disengaged state (S2). This state corresponds to a state until a timing T0 in FIG. 5 and in which the engaging hydraulic pressure chamber 26 illustrated in FIG. 3 has little volume.

Next, if a gear shift command is issued (S3: YES), the hydraulic pressure controller 83 of the control unit 100 instructs the linear solenoid valve 120 to set the set pressure (release pressure) of the pressure reducing valve 6 to a hydraulic pressure level L6 (S4). Whether "the gear shift command" is issued at S3 is determined based on the gear range sensor signal (P-range, R-range, N-range, or D-range), the vehicle speed sensor signal, and the accelerator opening signal.

Further, the set pressure of the pressure reducing valve is generally defined by adding a pushing force based on the pressure of the hydraulic oil charged into the spring chamber, to the biasing force of the return spring 62. However, in this embodiment and other embodiment and modifications, the set pressure of the pressure reducing valve is defined by the pressure of the hydraulic oil charged into the spring chamber without taking the biasing force of the return spring 62 into consideration.

The control unit 100 activates a built-in timer (S5), and the hydraulic pressure controller 83 instructs the linear solenoid valve 7 to increase the engaging pressure to the hydraulic pressure level L5 (S6). This state still corresponds to the state at the timing T0 in FIG. 5. Until the counted time by the timer reaches a timing T5 (while S8: NO), the hydraulic pressure controller 83 instructs the linear solenoid valve 7 to keep the engaging pressure at the hydraulic pressure level L5 (S7). This state corresponds to a period from the timing T0 to the timing T5 in FIG. 5 (first period).

Note that as illustrated in FIG. 5, the actual engaging pressures in the oil paths 74 and 75 extending to the frictional engageable element gradually increase to a hydraulic pressure level L1 from the timing T0 to a timing T1, increase to a hydraulic pressure level L2 at a sharper inclination from the timing T1 to a timing T2. Then the actual engaging pressures gradually increase to a hydraulic pressure level L3 from the timing T2 to a timing T3, and then increase to the hydraulic pressure level L5 at a sharper inclination from the timing T3 to a timing T4. From the timing T4 to the timing T5, the actual engaging pressure is the hydraulic pressure level L5 which is substantially the same as the instruction pressure.

Here, the hydraulic pressure level L5 is lower than the hydraulic pressure level L6 which is the set pressure of the pressure reducing valve 6. Therefore, in the first period from the timing T0 to the timing T5, the pressure reducing valve 6 does not perform a pressure limiting operation (pressure reducing operation) and the hydraulic pressures in the engaging hydraulic pressure chamber and the disengaging hydraulic pressure chamber become even.

Next, when the counted time by the timer reaches the timing T5 (S8: YES), the hydraulic pressure controller 83 instructs the linear solenoid valve 7 to increase the engaging pressure to a hydraulic pressure level L7 (S9). Note that, as illustrated in FIG. 5, the pressure increase at S9 is performed gradually from the timing T5 to a timing T7, i.e., at a continuously positive inclination. During the pressure increase (at a timing T6), the instruction engaging pressure and the actual engaging pressure exceed the set pressure level L6 of the pressure reducing valve 6. Thus, a pressure difference is produced between the engaging hydraulic pressure chamber and the disengaging hydraulic pressure chamber, which is described later in detail.

When the counted time by the timer reaches the timing T7 (S10: YES), the hydraulic pressure controller 83 instructs the linear solenoid valve 7 to keep the engaging pressure at the hydraulic pressure level L7 (S11).

Next, when the counted time by the timer reaches a timing T8 (S12: YES), the hydraulic pressure controller 83 instructs the linear solenoid valve 120 to drop the set pressure of the pressure reducing valve 6 to a hydraulic pressure level L4 (S13). As illustrated in FIG. 5, the pressure drop at S13 is a gradual hydraulic pressure drop from the timing T8 to a timing T9. When the counted time by the timer reaches the timing T9 (S14: YES), the hydraulic pressure controller 83 instructs the linear solenoid valve 120 to keep the set pressure of the pressure reducing valve 6 at the hydraulic pressure level L4 (S15).

Then the control unit 100 stops the timer (S16) and terminates the series of processes of the engaging operation.

Note that as illustrated in FIG. 5, the instruction engaging pressure from the hydraulic pressure controller 83 to the linear solenoid valve 7 increases with time from the hydraulic pressure level L5 at the timing T5 to the hydraulic pressure level L7 at the timing T7. This increase of the instruction pressure is achieved by a program stored in the hydraulic pressure controller 83 beforehand.

As further illustrated in FIG. 5, the pressure increase from the timing T5 to the timing T7 is performed such that the actual engaging pressure substantially matches with the instruction engaging pressure.

In this embodiment, the instruction engaging pressure from the hydraulic pressure controller 83 is kept at the hydraulic pressure level L5 in the first period, and the instruction engaging pressure is increased from the hydraulic pressure level L5 to the hydraulic pressure level L7 in a second period from the timing T5 to the timing T7. Thus, the instruction pressure in the second period changes with time, and this change is larger than that of the instruction pressure in the first period.

Further in this embodiment, the set pressure of the pressure reducing valve 6 is kept at the hydraulic pressure level L6 in the first period (from the timing T0 to the timing T5) and the second period (from the timing T5 to the timing T7), dropped from the timing T8 which is after the engagement is completed, and then is kept at the hydraulic pressure level L4 from the timing T9. Therefore, in this embodiment, after the timing T8, the instruction engaging pressure is kept at the hydraulic pressure level L7, but the pressure difference between the engaging hydraulic pressure chamber 26 and the disengaging hydraulic pressure chamber 27 is increased larger compared to the timing T7. Thus, after the engagement, the pushing force on the friction plate unit 5 is increased and the friction between the friction plates is increased.

Details of Engaging Operation

The engaging operation of the frictional engageable element is described in detail with reference to FIGS. 7 to 11 which illustrate the engaging operation of the second brake 22 as an example.

Figure 7:
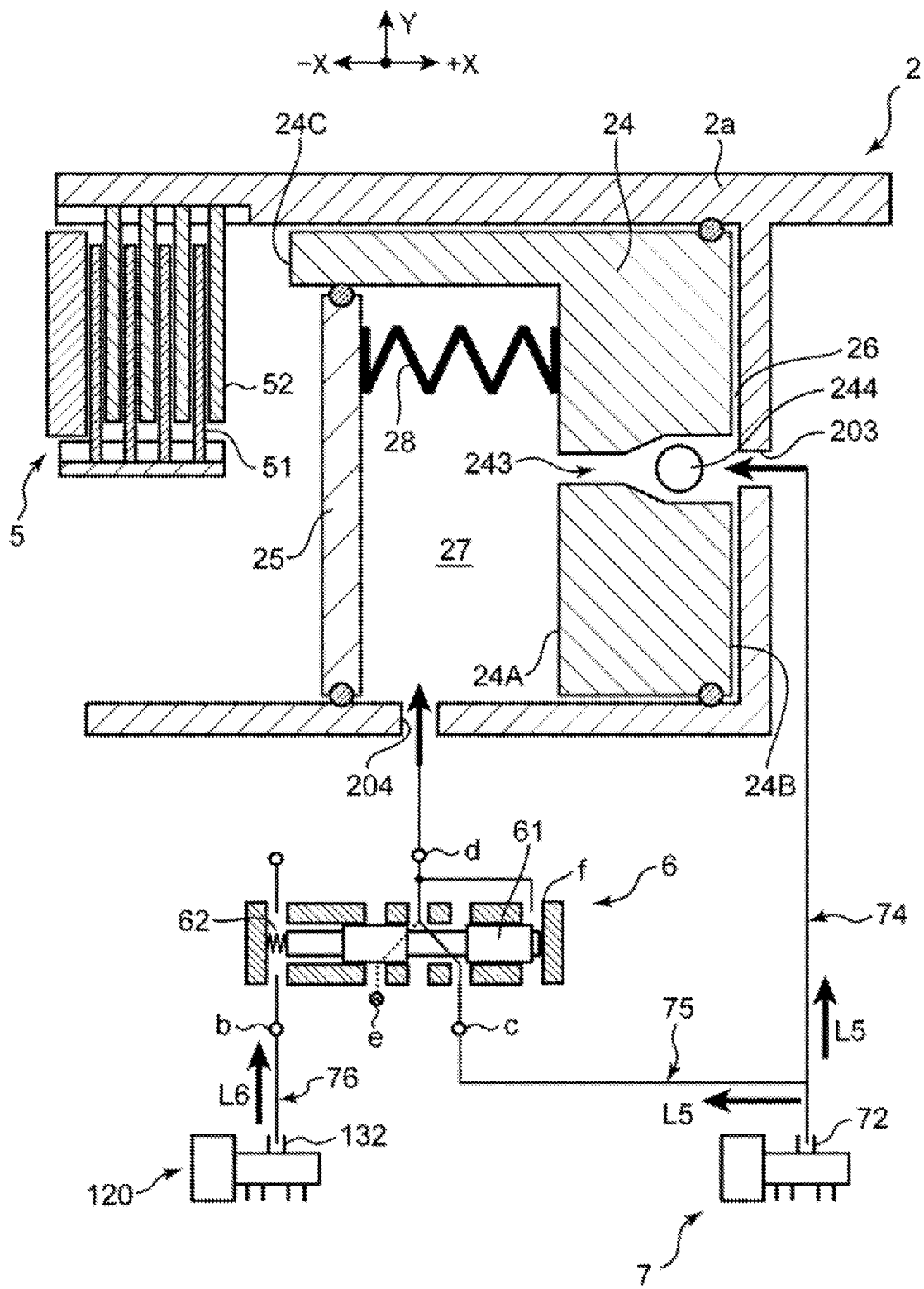
FIG. 7 is a cross-sectional view schematically illustrating the engaging operation of the second brake in the gear shift operation of the automatic transmission.

The state of the second brake 22 illustrated in FIG. 7 indicates the state around (before and after) the timing T0 in FIG. 5. The state before the timing T0 is a standby state where hydraulic pressure is not yet supplied to the engaging hydraulic pressure chamber 26 and the disengaging hydraulic pressure chamber 27 through the linear solenoid valve 7. Here, the piston 24 is pushed in the +X direction by the biasing force of the return spring 28 without receiving influence of hydraulic pressure, and located at the disengaging position. The tip end surface 24C of the piston 24 is separated from the friction plate unit 5 by a given distance, and the drive plate 51 and the driven plate 52 of the friction plate unit 5 are disengaged from each other. Due to the movement of the piston 24 in the +X direction, the engaging hydraulic pressure chamber 26 has the smallest volume, whereas the volume of the disengaging hydraulic pressure chamber 27 becomes the largest volume.

Note that in FIG. 7, for easier understanding of the structure, the second surface 24B of the piston 24 is slightly separated from the first wall portion 201 of the transmission case 2 in the −X direction; however, it may actually be in contact with the first wall portion 201.

First, when the gear shift command is issued as described above, the hydraulic pressure controller 83 instructs the linear solenoid valve 120 to keep the set pressure of the pressure reducing valve 6 at the hydraulic pressure level L6. The hydraulic pressure for this operation is supplied from the output port 132 of the linear solenoid valve 120 to the chamber of the return spring 62 of the pressure reducing valve 6 via the third oil path 76.

Next, when the hydraulic pressure controller 83 instructs the linear solenoid valve 7 to increase the engaging pressure to the hydraulic pressure level L5 at the timing T0, as indicated by the thick arrows at the first and second oil paths 74 and 75 illustrated in FIG. 7, the hydraulic oil is started to flow into the engaging hydraulic pressure chamber 26 and the disengaging hydraulic pressure chamber 27. For example, the hydraulic pressure controller 83 controls the input and output ports 71 and 72 of the linear solenoid valve 7 to communicate with each other so that the hydraulic oil discharged from the oil pump 81 flows through the first and second oil paths 74 and 75. Here, the pressure reducing valve 6 is in the state where the input port c is communicated with the output port d, because the hydraulic pressure level L5 is set lower than the hydraulic pressure level L6 which is the set pressure of the pressure reducing valve 6 as described above.

Further, the hydraulic oil is started to flow from the common output port 72 of the linear solenoid valve 7 into the engaging hydraulic pressure chamber 26 through the first oil path 74, and at the same time, into the disengaging hydraulic pressure chamber 27 through the upstream oil path 751 of the second oil path 75, the pressure reducing valve 6, and the downstream oil path 752. Here, the pushing force for the piston 24 is not hydraulically produced yet, and the piston 24 is located at its end position on the +X side due to the biasing force of the return spring 28.

Figure 8:
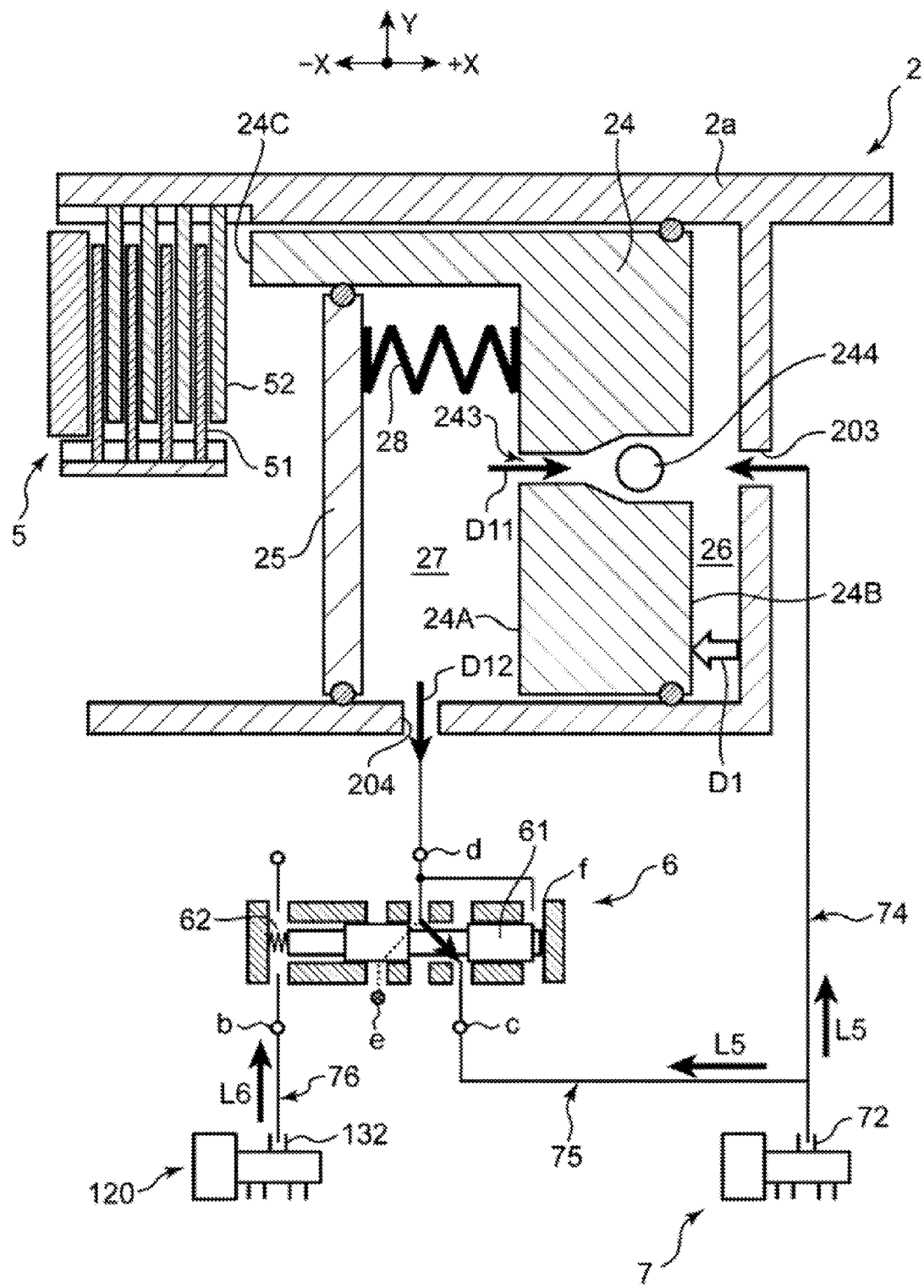
FIG. 8 is a cross-sectional view schematically illustrating the engaging operation of the second brake in the gear shift operation of the automatic transmission.

Next, the state of the second brake 22 illustrated in FIG. 8 indicates the state where the engaging hydraulic pressure chamber 26 and the disengaging hydraulic pressure chamber 27 are filled with the hydraulic oil after being started to flow as illustrated in FIG. 7, and the piston 24 moves in the −X direction. As illustrated in FIG. 8, also when the same level of hydraulic pressure is supplied to the engaging hydraulic pressure chamber 26 and the disengaging hydraulic pressure chamber 27, the piston 24 moves based on the pressure receiving area difference between the first and second surfaces 24A and 24B. Since the pressure receiving area of the second surface 24B of the piston 24 is larger than that of the first surface 24A as described above, a pushing force D1 acts on the piston 24 in the −X direction according to the pressure receiving area difference. In other words, when the hydraulic pressures of the engaging hydraulic pressure chamber 26 and the disengaging hydraulic pressure chamber 27 in this state are $P_{(L5)}$, the pressure receiving area of the section A is $S_A$, and the pressure receiving area of the section B is $S_B$, the pushing force D1 is defined by the following equation.

$$D1 = P_{(L5)} \times (S_B - S_A) \tag{1}$$

Thus, the piston 24 is moved in the −X direction by the pushing force D1. Note that, since the pushing force D1 needs to overtake the biasing force of the return spring 28 in +X direction, the pressure receiving area difference is set in consideration of the spring constant of the return spring 28.

When the piston 24 moves in the −X direction, the hydraulic pressure inside the disengaging hydraulic pressure chamber 27 increases. Since the piston 24 is in an early stage of the moving process in the −X direction, the volume of the disengaging hydraulic pressure chamber 27 is relatively large and contains a large amount of hydraulic oil. Therefore, as indicated by the arrow D11 of FIG. 8, the hydraulic oil in the disengaging hydraulic pressure chamber 27 flows into the engaging hydraulic pressure chamber 26 through the through-hole 243 according to the movement of the piston 24 in the −X direction. Thus, the balance in the hydraulic pressures between the engaging hydraulic pressure chamber 26 and the disengaging hydraulic pressure chamber 27 is substantially maintained.

Note that as indicated by the arrow D12, hydraulic oil may reverse back into the second oil path 75 depending on the level of hydraulic pressure inside the disengaging hydraulic pressure chamber 27.

Further, since the set pressure of the pressure reducing valve 6 is the hydraulic pressure level L6 which is higher than the hydraulic pressure level L5 supplied to the engaging hydraulic pressure chamber 26 and the disengaging hydraulic pressure chamber 27, the input port c and the output port d of the pressure reducing valve 6 remain communicated.

Since the engaging hydraulic pressure chamber 26 receives the hydraulic oil from the disengaging hydraulic pressure chamber 27 as described above, only a small amount of hydraulic oil is required to be supplied to the engaging hydraulic pressure chamber 26 through the first oil path 74. In other words, only the hydraulic oil at the flow rate high enough to produce the pushing force D1 based on the pressure receiving area difference is required to be applied through the linear solenoid valve 7. Therefore, high hydraulic responsiveness is obtained in moving the piston 24 in the −X direction. As the piston 24 moves, the tip end surface 24C approaches the friction plate unit 5 and the return spring 28 is gradually compressed.

Figure 9:
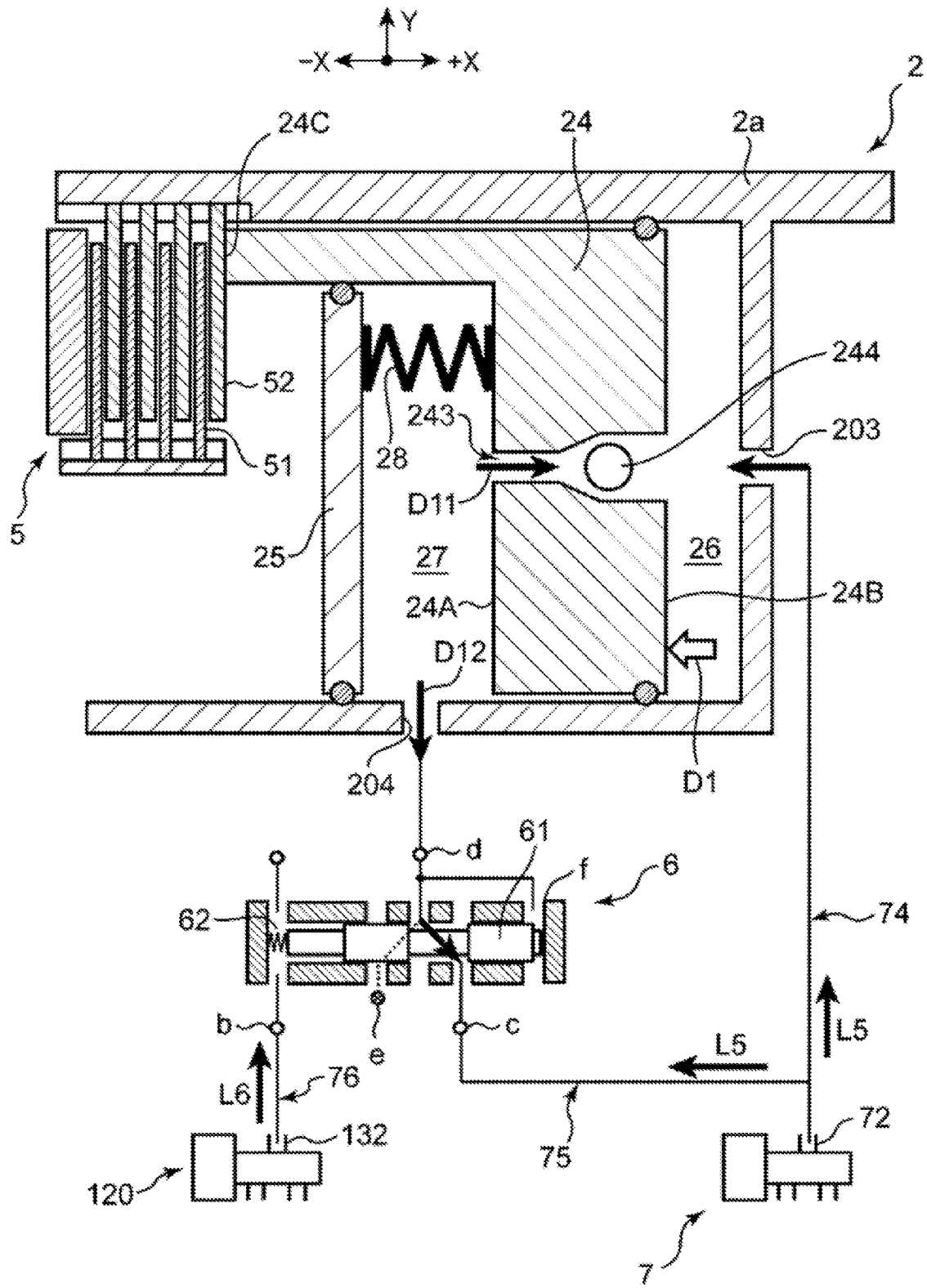
FIG. 9 is a cross-sectional view schematically illustrating the engaging operation of the second brake in the gear shift operation of the automatic transmission.

The state of the second brake 22 illustrated in FIG. 9 indicates the state from the timing T5 to the timing T6. The piston 24 moves in the −X direction and the tip end surface 24C is located at the position (engaging position) contacting with the friction plate unit 5 (driven plate 52), i.e., the zero touch state for friction plates 51, 52. Even in this state, only the pushing force D1 based on the pressure receiving area difference acts on the second surface 24B and the flows of oil indicated by the arrows D11 and D12 occur, same for the state of FIG. 8.

As the tip end surface 24C contacts with the friction plate unit 5 and as the piston 24 pushes the friction plate unit 5, the clearance between the drive plates 51 and the driven plates 52 is closed and eventually frictional engaging force is produced between the plates 51 and 52. Also at this point, only the pushing force D1 described above contributes in the pushing. Therefore, the drive plates 51 and the driven plates 52 are engaged by a little engaging pressure in the early stage of the engagement, which contributes in reducing the engaging shock of the friction plate unit 5.

Figure 10:
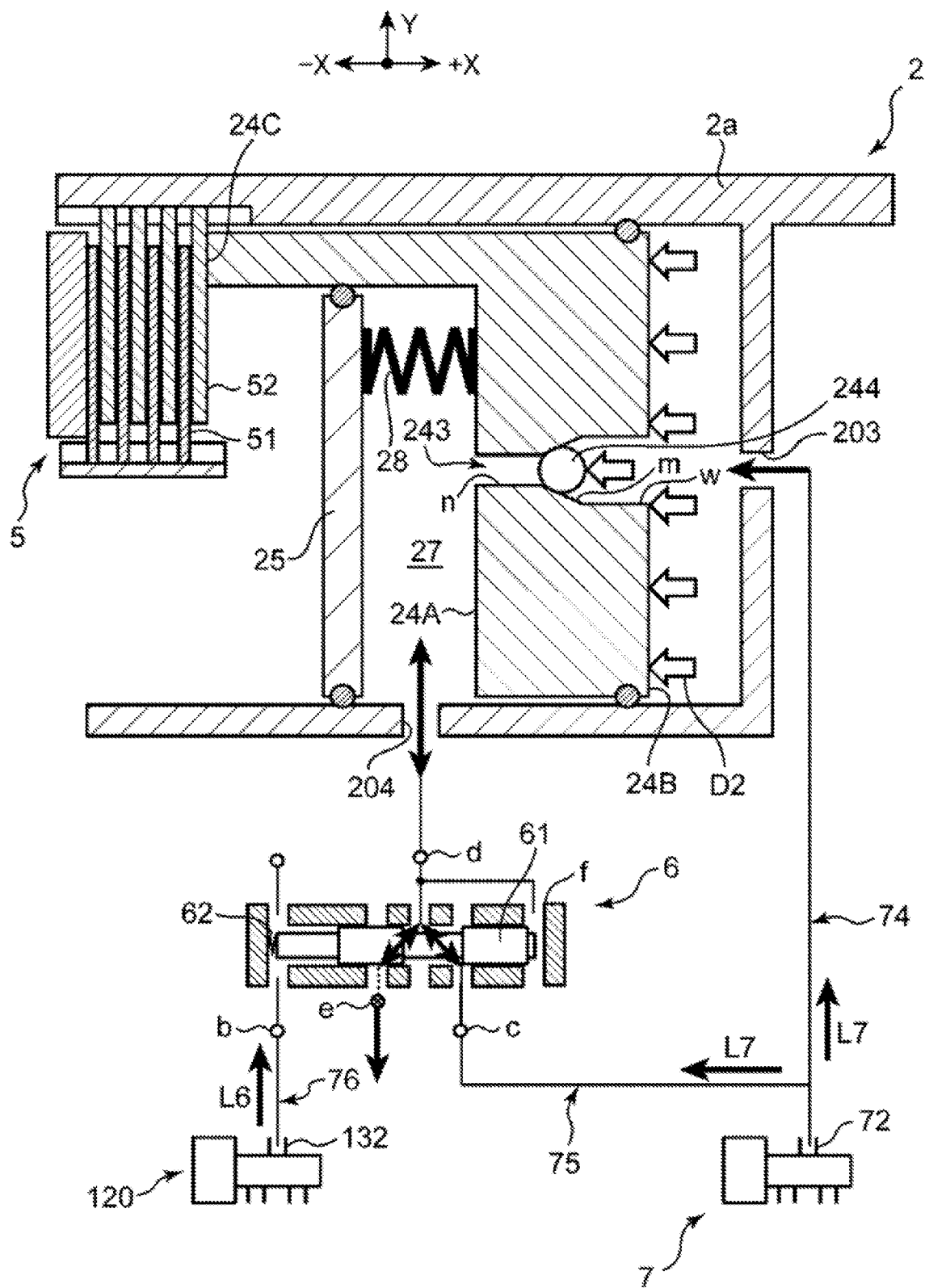
FIG. 10 is a cross-sectional view schematically illustrating the engaging operation of the second brake in the gear shift operation of the automatic transmission.

The state of the second brake 22 illustrated in FIG. 10 indicates the state after the timing T6 in the second period, and the friction plate unit 5 is engaged at a given engaging pressure. In this state, the hydraulic pressure controller 83 controls the linear solenoid valve 7 to discharge a given engaging hydraulic pressure (line pressure) from the output port 72. Thus, the engaging hydraulic pressure is suppliable to the engaging hydraulic pressure chamber 26 and the disengaging hydraulic pressure chamber 27 through the first and second oil paths 74 and 75.

Here, once the actual engaging pressure reaches the hydraulic pressure level L6 which is the set pressure of the pressure reducing valve 6, the pressure reducing valve 6 starts the pressure limiting operation (pressure reducing operation) to adjust the hydraulic pressure of the disengaging hydraulic pressure chamber 27 so as not to exceed a given pressure (lower than the hydraulic pressure of the engaging hydraulic pressure chamber 26). For example, when the hydraulic pressure of the disengaging hydraulic pressure chamber 27 increases and the feedback port f of the pressure reducing valve 6 receives higher hydraulic pressure than the set pressure (hydraulic pressure level L6), the spool 61 is moved in the −X direction by the hydraulic pressure and the output port d communicates with the drain port e. Therefore, the hydraulic pressure of the disengaging hydraulic pressure chamber 27 is maintained below the certain pressure. Thus, only the engaging hydraulic pressure chamber 26 is pressurized.

By having the pressure inside the engaging hydraulic pressure chamber 26 higher than that inside the disengaging hydraulic pressure chamber 27, the pressure ball 244 moves in the −X direction and blocks the through-hole 243. Therefore, the movements of the hydraulic oil in both directions between the engaging hydraulic pressure chamber 26 and the disengaging hydraulic pressure chamber 27 are restricted. Thus, a large pushing force D2 acts on the piston 24 in the −X direction according to the difference between the engaging hydraulic pressure (the hydraulic pressure of the engaging hydraulic pressure chamber 26) and the disengaging hydraulic pressure (the hydraulic pressure of the disengaging hydraulic pressure chamber 27) and to the pressure receiving area difference. For example, when the hydraulic pressure of the engaging hydraulic pressure chamber 26 at the timing T7 is $P26_{(T7)}$, the hydraulic pressure of the disengaging hydraulic pressure chamber 27 at the timing T7 is $P27_{(T7)}$, the pressure receiving area of the section A is $S_A$, and the pressure receiving area of the section B is $S_B$, the pushing force D2 is defined by the following equation.

$$D2 = P26_{(T7)} \times S_B - P27_{(T7)} \times S_A \tag{2}$$

In Equation 2, the hydraulic pressure $P27_{(T7)}$ of the disengaging hydraulic pressure chamber 27 is substantially the same as the hydraulic pressure level L6 which is the set pressure of the pressure reducing valve 6 in the first and second periods.

Thus, since the pushing force D2 larger than the pushing force D1 based on the pressure receiving area difference is applied, the piston 24 is pushed in the −X direction with a stronger force. This pushing force D2 is given to the friction plate unit 5 via the tip end surface 24C, and thus the second period ends.

Figure 11:
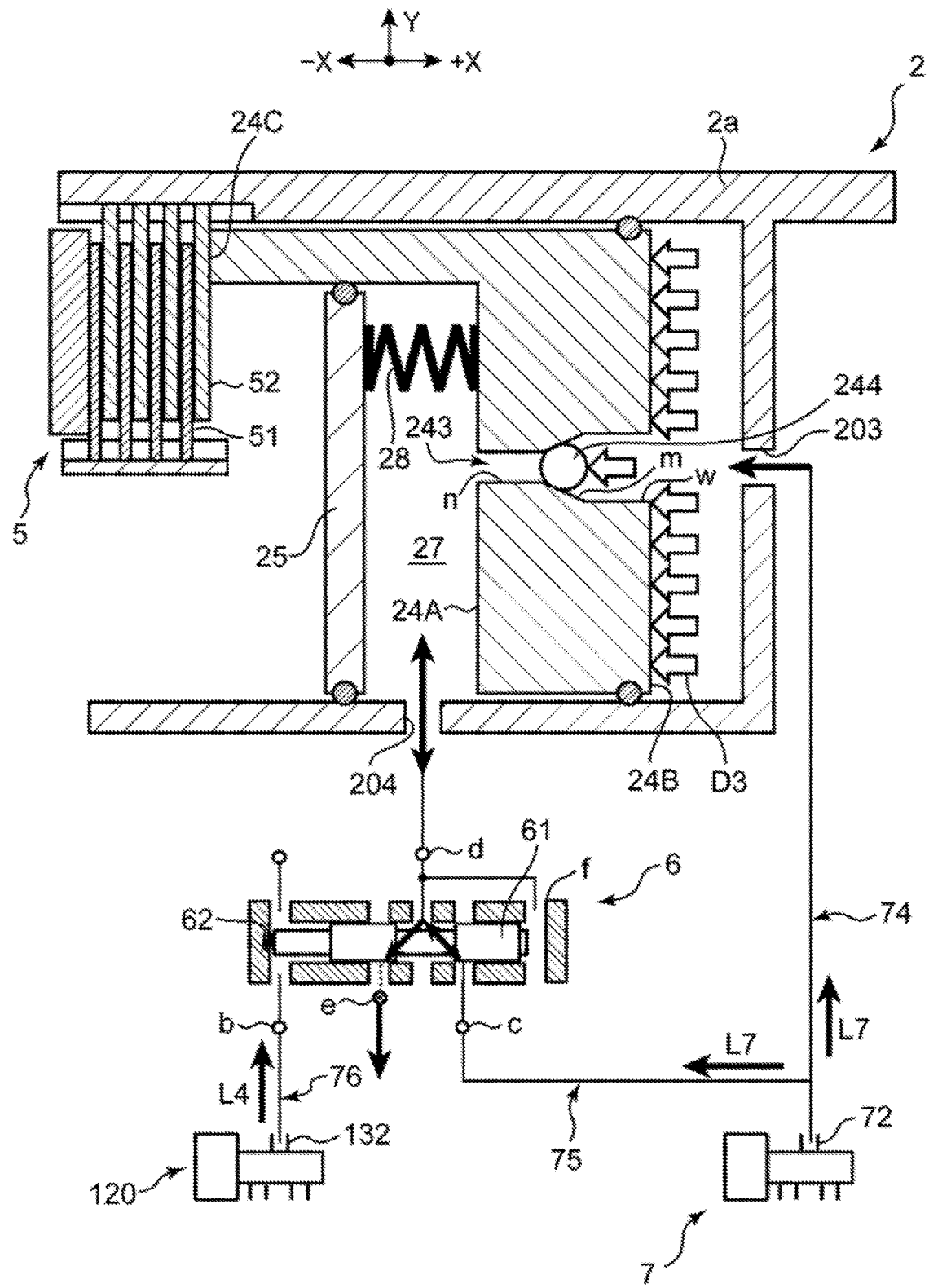
FIG. 11 is a cross-sectional view schematically illustrating the engaging operation of the second brake in the gear shift operation of the automatic transmission.

The state of the second brake 22 illustrated in FIG. 11 corresponds to the state after the timing T9 which is after the second period. A specific difference of this state from FIG. 10 is that the hydraulic pressure supplied to the spring chamber of the pressure reducing valve 6 from the linear solenoid valve 120 is depressurized to the hydraulic pressure level L4, which makes the set pressure of the pressure reducing valve 6 dropped to the hydraulic pressure level L4.

Thus, in the state illustrated in FIG. 11, an even larger pushing force D3 in the −X direction acts on the piston 24 according to the difference between the hydraulic pressure of the engaging hydraulic pressure chamber 26 and the hydraulic pressure of the disengaging hydraulic pressure chamber 27, and the pressure receiving area difference. For example, when the hydraulic pressure of the engaging hydraulic pressure chamber 26 at the timing T9 is $P26_{(T9)}$, the hydraulic pressure of the disengaging hydraulic pressure chamber 27 at the timing T9 is $P27_{(T9)}$, the pressure receiving area of the section A is $S_A$, and the pressure receiving area of the section B is $S_B$, the pushing force D3 is defined by the following equation.

$$D3 = P26_{(T9)} \times S_B - P27_{(T9)} \times S_A \quad (3)$$

By comparing this Equation 3 with Equation 2, the following relationship is established.

$$P26_{(T9)} = P26_{(T7)} \quad (4)$$

$$P27_{(T9)} < P27_{(T7)} \quad (5)$$

Therefore, the following relationship is established.

$$D3 > D2 \quad (6)$$

As described above, in the control of the automatic transmission 1 of this embodiment, by reducing the set pressure (release pressure) of the pressure reducing valve 6 after completing the engagement of the friction plate unit 5, the pushing force against the friction plate unit 5 is increased. Thus, the friction force of the friction plate unit 5 increases in proportion to the pushing force against the friction plate unit 5 based on Coulomb's law.

Note that each of the pushing forces D1 to D3 is defined in consideration of the pushing force in the +X direction from the return spring 28.

Operations and Effects

According to a method of controlling the automatic transmission 1 of this embodiment, the instruction for maintaining the hydraulic pressure level L5 which is set according to the state of the automatic transmission 1 is outputted to the linear solenoid valve 7 in the first period in response to the gear shift command. In other words, according to the control method of the automatic transmission 1, "the pre-charging process" used in the art of WO2012/144207A1 is not provided. Therefore, the time of the engagement control is shortened and the control is simplified. Moreover, in a case of employing the pre-charging in the engagement control, a so-called pre-charge learning (a feedback of a pre-charging time) is required and complicates the control, whereas in the control method of this embodiment which does not employ the pre-charging process, such a pre-charge learning is not required.

Note that as is apparent from FIG. 5, in this embodiment, "the first period in response to the gear shift command" means "immediately after the issuance of the gear shift command," which means that the timing T0 which is the received timing of the gear shift command is the start timing of the first period and another process (e.g., pre-charging process) does not intervene between the issuance and the timing T0.

Moreover, according to the control method of the automatic transmission 1 of this embodiment, the following operations and effects are obtained in combination with the structure of the automatic transmission 1. The automatic transmission 1 includes the linear solenoid valve 7 commonly used for the engaging hydraulic pressure chamber 26 and the disengaging hydraulic pressure chamber 27. The automatic transmission 1 further includes the first oil path 74 communicating the output port 72 of the linear solenoid valve 7 with the engaging hydraulic pressure chamber 26, and the second oil path 75 communicating the output port 72 with the disengaging hydraulic pressure chamber 27. When causing the friction plate unit 5 to change from the disengaged state to the engaged state, hydraulic pressure is supplied from the output port 72 simultaneously to the engaging hydraulic pressure chamber 26 and the disengaging hydraulic pressure chamber 27 through the first and second oil paths 74 and 75, respectively.

In the above structure, the hydraulic pressure receiving area of the second surface 24B of the piston 24 is set larger than that of the first surface 24A. Therefore, even when the hydraulic pressure applied to the first surface 24A from the disengaging hydraulic pressure chamber 27 is the same as the hydraulic pressure applied to the second surface 24B from the engaging hydraulic pressure chamber 26, the piston 24 is moved in the engaging direction (−X direction) by the pushing force D1 according to the pressure receiving area difference which corresponds to the section of the second surface 24B larger than the first surface 24A. When changing from the disengaged state to the engaged state, since the piston 24 is moved by the weak pushing force D1 corresponding to the pressure receiving area difference, the engaging shock of the friction plate unit 5 is reduced. Moreover, a complicated hydraulic pressure control for the engaging shock reduction is unnecessary. That is, a complicated control for reducing the flow rate of the hydraulic oil immediately before a completion of a piston stroke is avoided, and thus the engagement control time is shortened.

Since the piston 24 includes the through-hole 243 communicating the engaging hydraulic pressure chamber 26 with the disengaging hydraulic pressure chamber 27, when the pressure of the disengaging hydraulic pressure chamber 27 increases, the hydraulic oil flows into the engaging hydraulic pressure chamber 26 through the through-hole 243. Therefore, when moving the piston 24 in the engaging direction, the engaging hydraulic pressure chamber 26 receives the hydraulic oil from the disengaging hydraulic pressure chamber 27. Thus, only a small amount of hydraulic oil is required to be supplied to the engaging hydraulic pressure chamber 26 through the first oil path 74. In other words, only the hydraulic oil for producing the pushing force D1 based on the pressure receiving area difference is required to be supplied to the engaging hydraulic pressure chamber 26 through the linear solenoid valve 7.

Therefore, in the automatic transmission 1 of this embodiment, since the piston 24 moves with the small amount of oil, the responsiveness in engaging the friction plate unit 5 is improved. This improvement is advantageously exerted even when the clearance C between the drive plates 51 and the driven plates 52 is widened in order to reduce a so-called drag resistance of the friction plate unit 5. Thus, even when the required moving distance of the piston 24 for the frictional engagement is increased, only a small amount of oil is required to flow into the engaging hydraulic pressure chamber 26 from the first oil path 74, which prevents the responsiveness for the frictional engagement from lowering. As a result, both the reduction in the drag resistance and the improvement in the responsiveness of the frictional engagement are achieved.

The pressure ball 244 for restricting the oil flow from the engaging hydraulic pressure chamber 26 to the disengaging hydraulic pressure chamber 27 is disposed in the through-hole 243. The pressure ball 244 blocks the through-hole 243 when needed, to prohibit the flow of the hydraulic oil between the engaging hydraulic pressure chamber 26 and the disengaging hydraulic pressure chamber 27. Thus, the engaging hydraulic pressure chamber 26 and the disengaging hydraulic pressure chamber 27 are hydraulically separated from each other, and cause the large pushing forces D2 and D3 to act on the piston 24 in the engaging direction.

The second oil path 75 includes the pressure reducing valve 6 for preventing the hydraulic pressure of the disengaging hydraulic pressure chamber 27 from exceeding the given value. The pressure reducing valve 6 adjusts the hydraulic pressure of the disengaging hydraulic pressure chamber 27 at or below the set pressure of the pressure reducing valve 6 to achieve the smooth movement of the piston 24 in the engaging direction (-X direction). For example, after the piston 24 contacts with the friction plate unit 5 and the clearance C between the plates 51 and 52 is closed, the given engaging hydraulic pressure is supplied to the engaging hydraulic pressure chamber 26 through the first oil path 74, while adjusting the hydraulic pressure of the disengaging hydraulic pressure chamber 27 by the pressure reducing valve 6. Thus, the piston 24 is smoothly moved to the engaging position.

Note that the output port 132 of the linear solenoid valve 120 is connected to the spring chamber of the pressure reducing valve 6 via the third oil path 76, and the set pressure of the pressure reducing valve 6 is set to the hydraulic pressure level L6 from the timing T0 to the timing T8, and to the low hydraulic pressure level L4 from the timing T9. Therefore, after completing the engagement illustrated in FIG. 10, the pushing force of the piston 24 on the friction plate unit 5 is increased from D2 to D3 as illustrated in FIG. 11, which is advantageous in a case where a drive force of a high torque is inputted.

The automatic transmission 1 includes the linear solenoid valve 7 as the hydraulic pressure control valve for the engaging hydraulic pressure chamber 26 and the disengaging hydraulic pressure chamber 27, and the linear solenoid valve 120 as the hydraulic pressure (release pressure) control valve for the spring chamber of the pressure reducing valve 6. Therefore, the oil supply amount is adjusted correspondingly to the power distribution amount to the solenoid coil of each of the linear solenoid valves 7 and 120, and a highly accurate hydraulic pressure control is achieved.

First Modification

A control at the time of a gear shift operation of the automatic transmission 1 according to a first modification is described with reference to FIG. 12 which is a flowchart corresponding to FIG. 6 which is used for the above embodiment, and illustrates an engaging operation of the second brake 22 of the above embodiment as an example. Note that in this flowchart, if a process is denoted with the same reference character as FIG. 6 (e.g., S1, S2, . . . ), this means that the process is the same as the one in the above embodiment. The timings T0 to T9 are also the same as the respective timings illustrated in FIG. 5 of the above embodiment.

Figure 12:
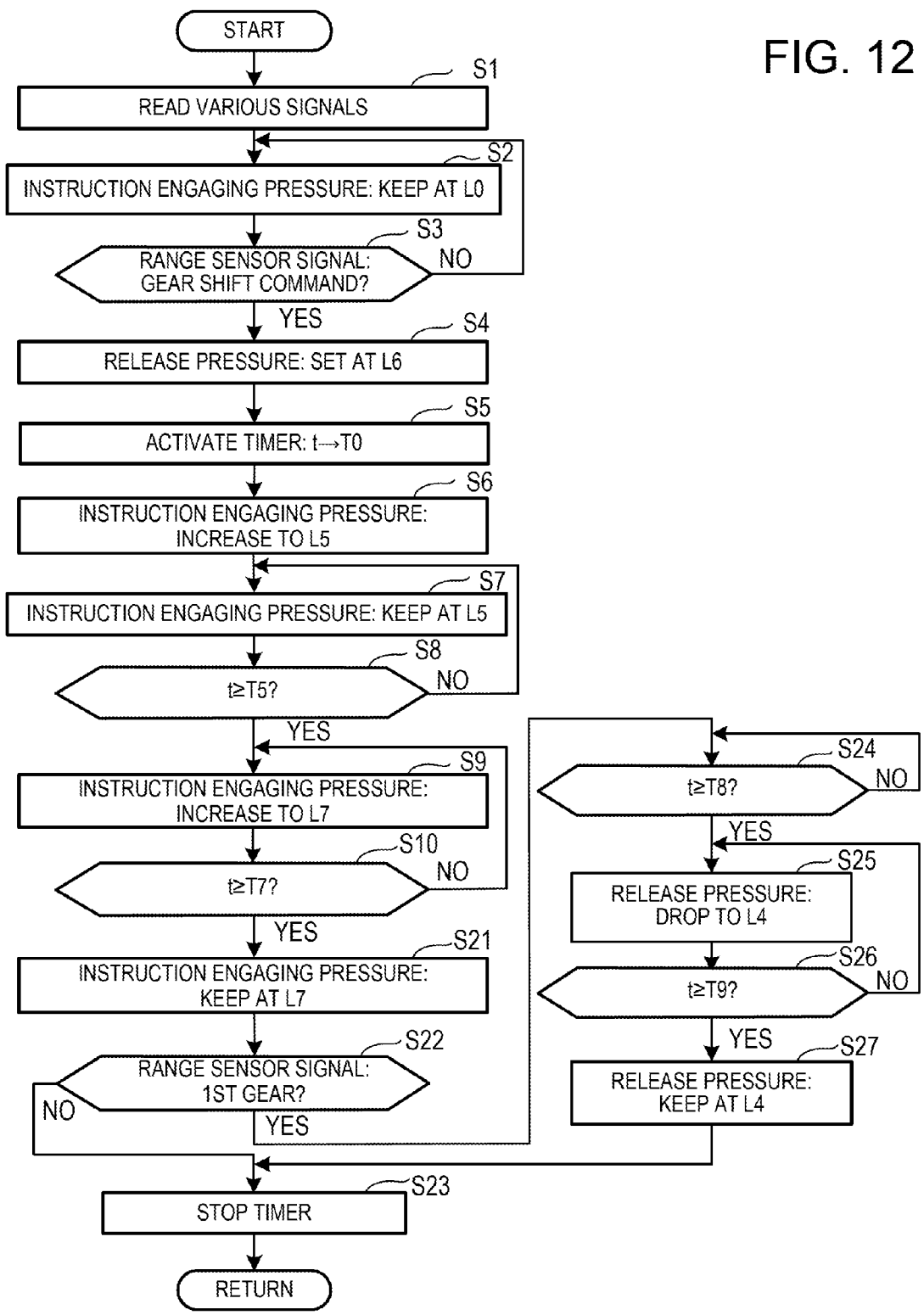
FIG. 12 is a flowchart illustrating a control in a gear shift operation of the automatic transmission according to a first modification.

As illustrated in FIG. 12, S1 to S10 of the engaging operation of this modification are the same as the engaging operation of the above embodiment. Therefore, the description is omitted.

As illustrated in FIG. 12, in the engaging operation of this modification, once the counted time by the timer reaches the timing T7 (S10: YES), the hydraulic pressure controller 83 instructs the linear solenoid valve 7 to keep the instruction engaging pressure at the hydraulic pressure level L7 (S21). Then the control unit 100 determines whether the selected gear range is "first gear" based on the received gear range information (S22). If the gear range is not "first gear" (S22: NO), the control unit 100 stops the timer (S23) and terminates the engaging operation.

On the other hand, if the gear range is "first gear" (S22: YES), the control unit 100 waits until the counted time reaches the timing T8 (S24: YES), and the hydraulic pressure controller 83 instructs the linear solenoid valve 120 to drop the hydraulic pressure supplied to the spring chamber of the pressure reducing valve 6 to the hydraulic pressure level L4 (S25).

Once the counted time by the timer reaches the timing T9 (S26: YES), the hydraulic pressure controller 83 instructs the linear solenoid valve 120 to keep the hydraulic pressure for the spring chamber at the hydraulic pressure level L4 (S27), the control unit 100 stops the timer (S23) and terminates the engaging operation.

As described above, with the control method of the automatic transmission 1 of this modification, the set pressure of the pressure reducing valve 6 is changed according to the information of the gear range (whether the selected gear range is "first gear"). For example, in a case where a high torque is applied in a low gear range, the pushing force on the friction plate unit 5 after being engaged is increased to the pushing force D3 to prevent a slip of the friction plate unit 5. In a case where a different gear range is selected, the pushing force on the friction plate unit 5 is kept at the pushing force D2.

Note that in this modification, the set pressure of the pressure reducing valve 6 is changed only if the selected gear range is "first gear"; however, the set pressure may similarly be changed also when the gear range is "second gear" or "third gear." In this case, the pushing force is not necessarily D3 and may be set to any force as long as it is higher than D2. The pushing force is increased by causing the difference in hydraulic pressures between the engaging hydraulic pressure chamber 26 and the disengaging hydraulic pressure chamber 27 to be larger.

Second Modification

Figure 13:
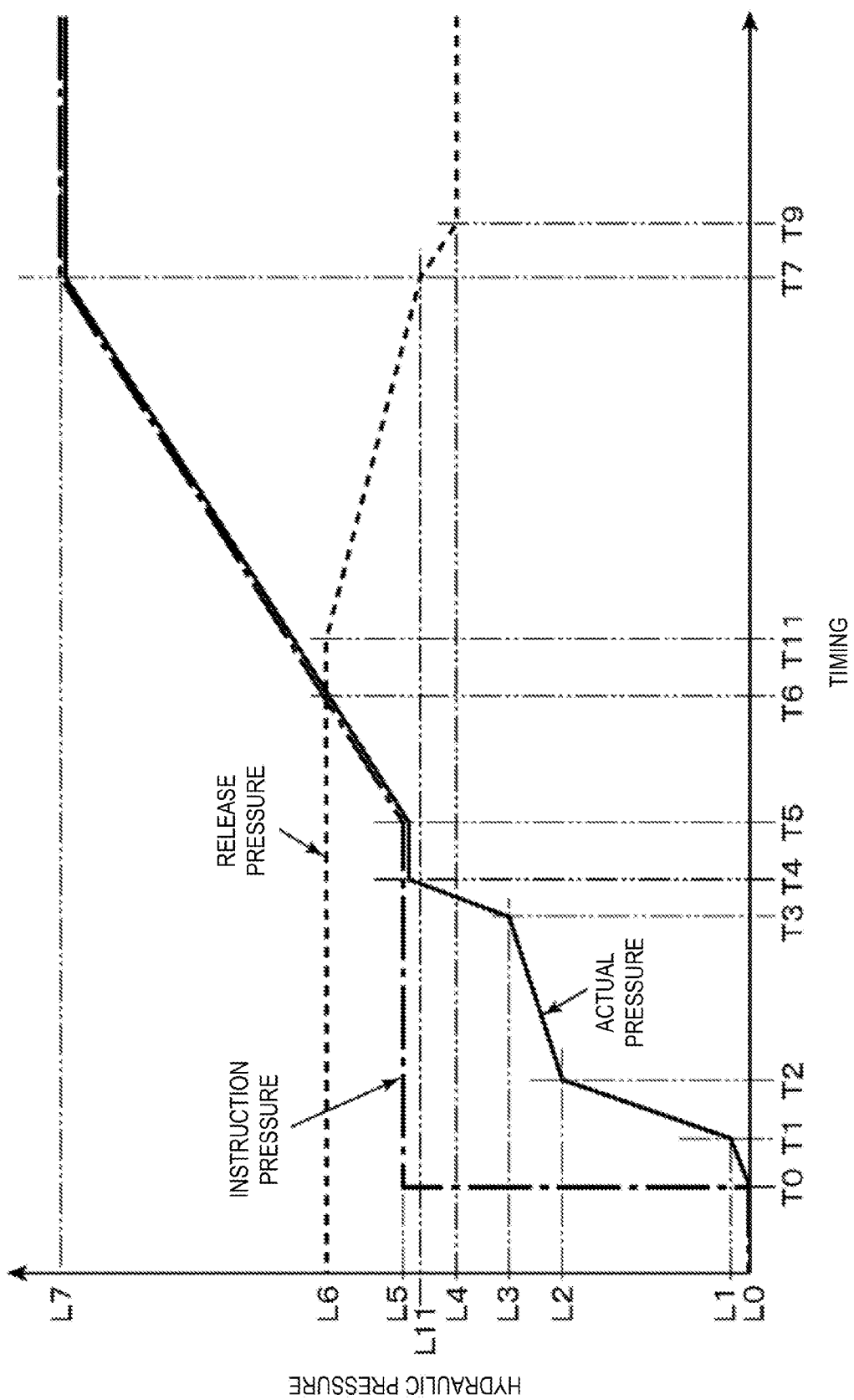
FIG. 13 is a time chart of a hydraulic pressure control executed by the hydraulic pressure controller to engage the second clutch of the automatic transmission according to a second modification.

A control at the time of a gear shift operation of the automatic transmission 1 according to a second modification is described with reference to FIG. 13 which is a time chart corresponding to FIG. 5 which is used for the above embodiment, and illustrates an engaging operation of the second brake 22 of the above embodiment as an example. Note that, the processes in a period from T0 to T6 in FIG. 13 are the same as the above embodiment. Therefore, the engaging operation in this period is omitted.

As illustrated in FIG. 13, in the engaging operation of this modification, the hydraulic pressure supplied to the spring chamber of the pressure reducing valve 6 from the linear solenoid valve 120 is gradually reduced from a timing T11 which is slightly after the timing T6. For example, in this modification, the set pressure of the pressure reducing valve 6 is gradually linearly reduced from the hydraulic pressure level L6 at the timing T11 to a hydraulic pressure level L11 at the timing T7.

Next, from the timing T7 when the engagement completes, toward the timing T9, the set pressure of the pressure reducing valve 6 is reduced to the hydraulic pressure level L4 gradually but at a sharper inclination, and then the set pressure of the pressure reducing valve 6 is kept at the hydraulic pressure level L4.

In this modification, unlike the above embodiment, instead of keeping the set pressure of the pressure reducing valve 6 at a certain pressure from the timing T6 to the timing T7 in the second period, the set pressure is gradually reduced. Thus, the pushing force for the engagement is controlled more delicately (finely).

Note that also in this modification, since the release pressure of the pressure reducing valve 6 is kept at the hydraulic pressure level L6 until the instruction pressure of the disengaging hydraulic pressure chamber 27 exceeds the release pressure, the engaging shock is reduced similarly to the above case.

Third Modification

A control at the time of a gear shift operation of the automatic transmission 1 according to a third modification is described with reference to FIGS. 14A and 14B which are time charts corresponding to a part of FIG. 5 which is used for the above embodiment, and illustrates an engaging operation of the second brake 22 of the above embodiment as an example.

Figure 14A:
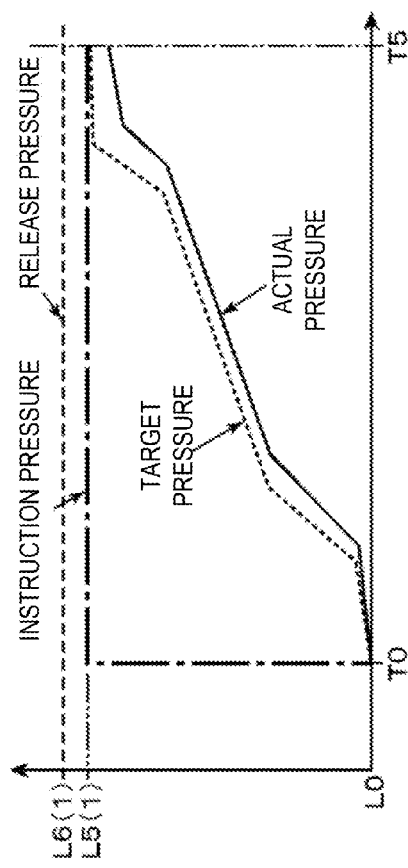
FIG. 14A is a time chart of a hydraulic pressure control when engaging the second clutch of the automatic transmission according to a third modification before a release pressure is changed.
Figure 14B:
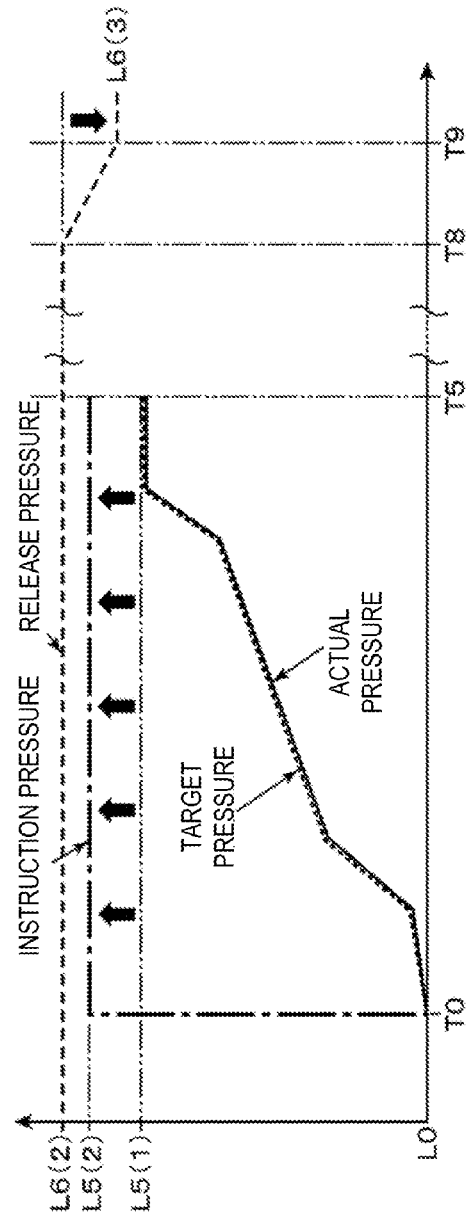
FIG. 14B is a time chart of the hydraulic pressure control when engaging the second clutch of the automatic transmission according to the third modification after the release pressure is changed.

Note that FIG. 14A illustrates a relationship between a target pressure and an actual pressure of hydraulic oil in a state where the instruction engaging pressure is a hydraulic pressure level L5(1), and FIG. 14B illustrates a relationship between a target pressure and an actual pressure of hydraulic oil in a state where the instruction engaging pressure is a hydraulic pressure level L5(2).

As illustrated in FIG. 14A, when the instruction engaging pressure is the hydraulic pressure level L5(1), the actual engaging pressure may be different from the target pressure in the first period from the timing T0 to the timing T5. Such a difference can be assumed to have been caused due to aging of hydraulic oil, varying outside environments, etc.

Therefore, as illustrated in FIG. 14B, the instruction engaging pressure is changed to the hydraulic pressure level L5(2) which is higher than the hydraulic pressure level L5(1). Thus, the actual engaging pressure substantially matches with the target pressure in the first period.

Here, the instruction engaging pressure in the first period is set lower than the set pressure of the pressure reducing valve 6 in order to reduce the engaging shock as described above. Therefore in this modification, as illustrated in FIG. 14B, the set pressure of the pressure reducing valve 6 is changed from a hydraulic pressure level L6(1) to a hydraulic pressure level L6(2) as the instruction engaging pressure is changed to the hydraulic pressure level L5(2). By also changing the set pressure of the pressure reducing valve 6 according to the change of the instruction engaging pressure in the first period, the degree of freedom for the control is increased.

Note that as illustrated in FIG. 14B, the set pressure of the pressure reducing valve 6 is dropped from the timing T8 similarly to the above embodiment, to be a hydraulic pressure level L6(3) from the timing T9. Thus, the pushing force against the friction plate unit after the engagement is increased.

Further, the difference between the hydraulic pressure level L5(1) and the hydraulic pressure level L5(2) and the difference between the hydraulic pressure level L6(1) and the hydraulic pressure level L6(2) are numeric values obtained through experiments conducted beforehand or from experiences, based on the difference between the target pressure and the actual engaging pressure in FIG. 14A.

Fourth Modification

A control at the time of a gear shift operation of the automatic transmission 1 according to a fourth modification is described with reference to FIG. 15 which is a flowchart illustrating a control of the second brake 22 while the vehicle is traveling in a given gear range.

Figure 15:
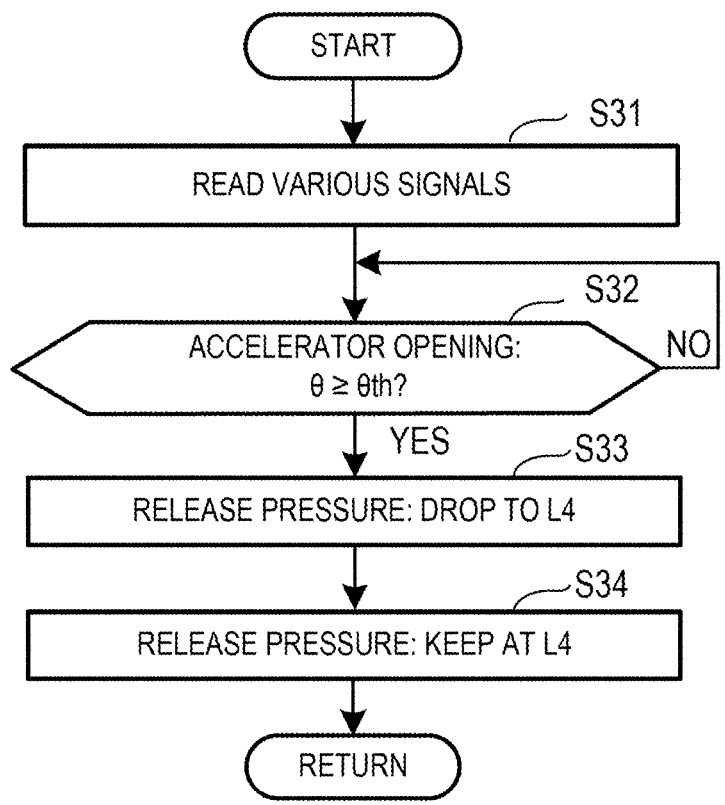
FIG. 15 is a flowchart illustrating a control of the second brake of the automatic transmission according to a fourth modification.

As illustrated in FIG. 15, also while the vehicle is traveling in the given gear range, the control unit 100 reads various signals (S31). The read signals include information regarding the state of the vehicle similarly to the above embodiment, such as the vehicle speed information detected by the vehicle speed sensor 111, the accelerator opening information detected by the accelerator opening sensor 112, the brake information detected by the brake sensor 113, the gear range (gear shift) information detected by the gear range sensor 114, the oil temperature information detected by the oil temperature sensor 115, and the actual pressure (measured hydraulic pressure) information detected by the hydraulic pressure sensor 116.

In the control of this modification, among the various read signals, whether the accelerator opening $\theta$ is a given threshold $\theta\text{th}$ or above is determined (S32). If the accelerator opening $\theta$ is the threshold $\theta\text{th}$ or above (S32: YES), the hydraulic pressure controller 83 instructs the linear solenoid valve 120 to drop the set pressure of the pressure reducing valve 6 to the hydraulic pressure level L4 (S33), and then keep it at the hydraulic pressure level L4 (S34).

In this modification, even when the gear shift operation is not performed, the set pressure of the pressure reducing valve 6 is dropped from the hydraulic pressure level L7 to the hydraulic pressure level L4. Thus, the pushing force on the friction plate unit 5 of the second brake 22 is increased from D2 to D3.

Here, the accelerator opening $\theta$ being at the threshold $\theta\text{th}$ or above means that the vehicle is in a condition which requires a high acceleration, such as accelerating to overtake another vehicle on a highway road, and it is required to reduce a slip of the friction plate unit 5 as much as possible and output a drive force to the output gear 4 with high efficiency. In this regard, since the pushing force is increased to D3 as described above, the highly efficient output of the drive force to the output gear 4 is achieved.

Note that although in this modification the operation of the second brake 22 is applied as an example, the other frictional engageable elements (first brake 21, first to third clutches 31 to 33) may similarly be applied.

Supplemental Description Regarding Instruction Pressure Setting

The setting of the instruction pressure from the hydraulic pressure controller 83 to the linear solenoid valve is supplementarily described with reference to FIGS. 16A and 16B.

Figure 16A:
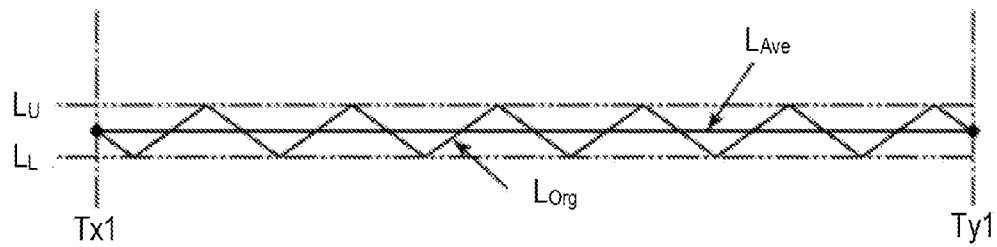
FIGS. 16A and 16B are schematic diagrams illustrating the settings of the instruction pressure.

FIG. 16A schematically illustrates the instruction engaging pressure in the first period from the timing T0 to the timing T5 in FIG. 5. The instruction to the linear solenoid valve from the hydraulic pressure controller 83 is performed by, for example, a current control. Therefore, as illustrated in FIG. 16A, an actual instruction pressure $L_{Org}$ between a timing Tx1 and a timing Ty1 varies between a value $L_L$ and a value $L_U$. In this embodiment, the instruction pressure $L_{Org}$ with such a variation is described as an instruction pressure $L_{Ave}$ which is an average value of the varying instruction pressure $L_{Org}$.

Figure 16B:
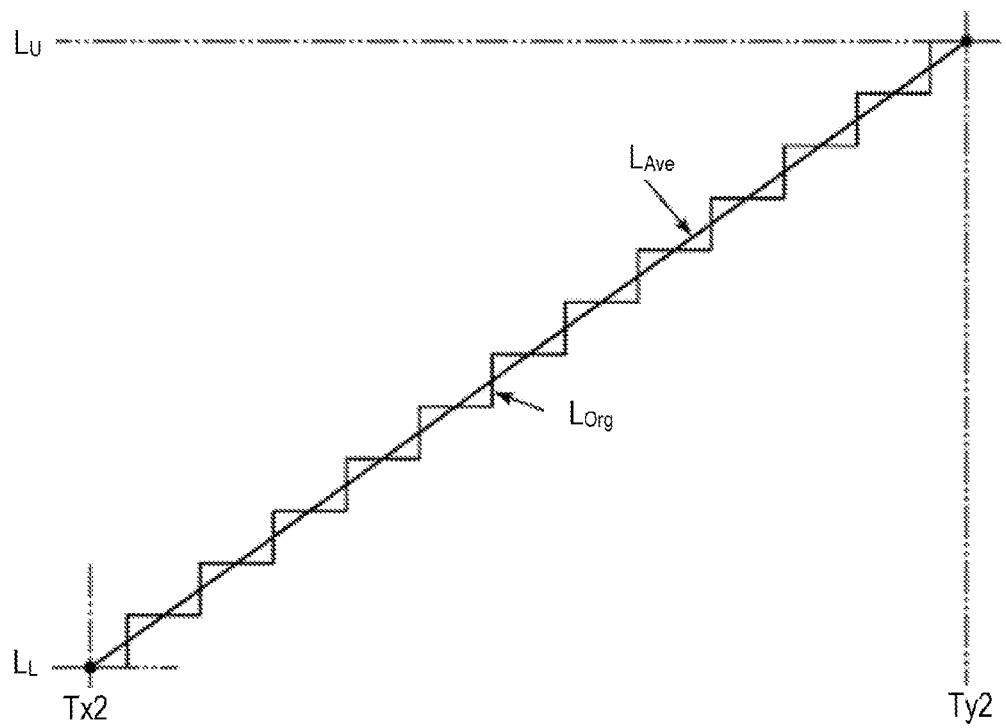

FIG. 16B schematically illustrates the instruction engaging pressure in the second period from the timing T5 to the timing T7 in FIG. 5. As illustrated in FIG. 16B, the actual instruction pressure $L_{Org}$ between a timing Tx2 and a timing Ty2 increases from the value $L_L$ to the value Lu in a stepwise fashion. In the embodiment, etc., such an actual instruction pressure $L_{Org}$ is described as an instruction pressure $L_{Ave}$ which is a regression line (linear regression line in FIG. 16B).

Note that the instruction engaging pressure in the second period may be expressed by a curved regression line depending on the mode of the actual instruction pressure.

This supplemental matter may also be adopted to the instruction pressures for the linear solenoid valves 120 to 124.

Another Embodiment

Figure 17:
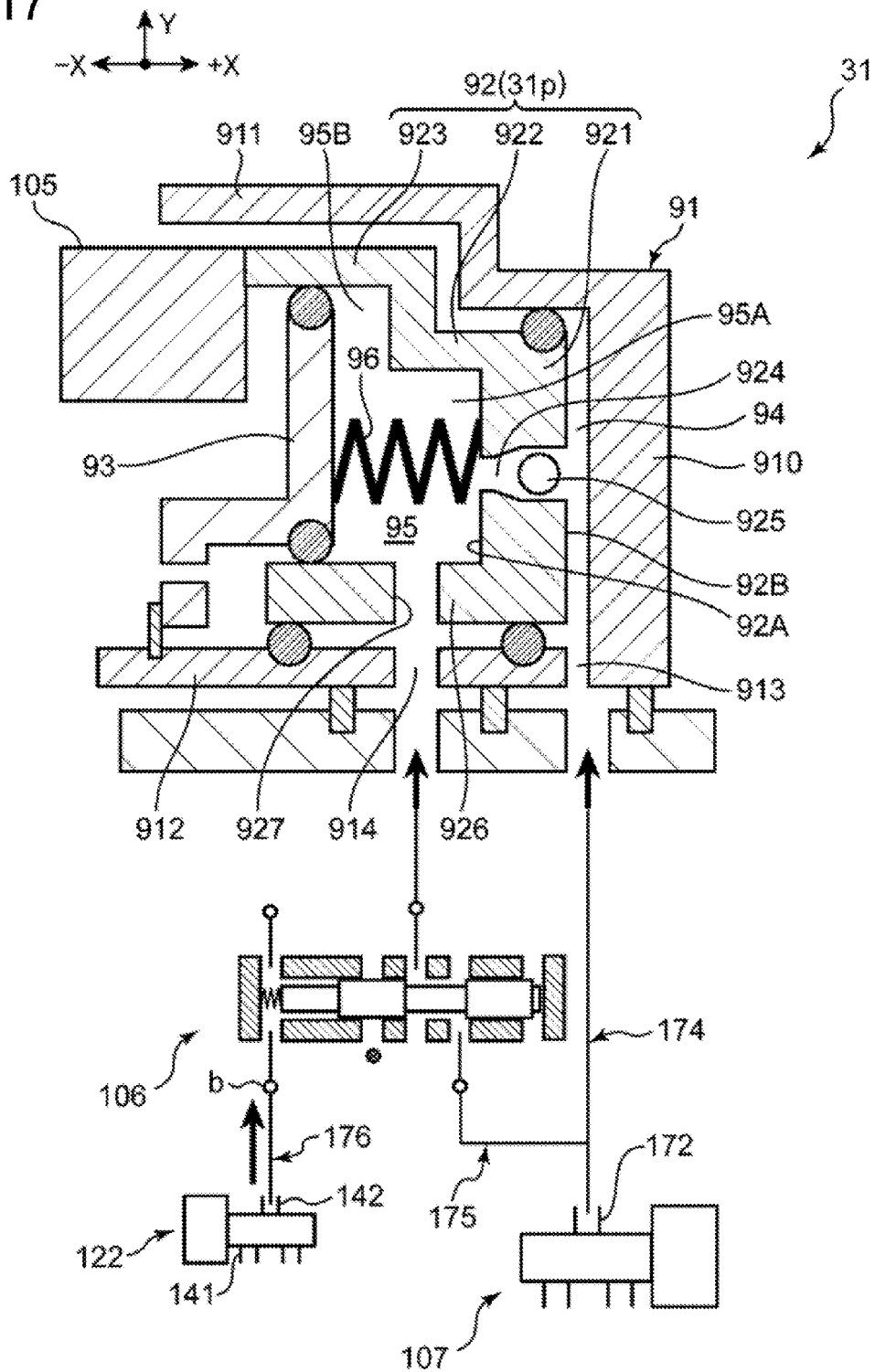
FIG. 17 is a view illustrating a schematic cross section of a structure of a first clutch which is one of the frictional engageable elements, and illustrating a part of a configuration of a hydraulic mechanism of the first clutch.

In the above embodiment, the second brake 22 is described as one example of the frictional engageable element. In the following embodiment, a clutch is described as another example of the frictional engageable element. FIG. 17 is a view schematically illustrating a configuration of the first clutch 31 which is one of the frictional engageable elements provided to the automatic transmission 1.

As illustrated in FIG. 17, the first clutch 31 includes a drum 91, a piston 92, a sealing ring 93, an engaging hydraulic pressure chamber 94, and a disengaging hydraulic pressure chamber 95. The first clutch 31 engages and disengages a friction plate unit 105. A pressure reducing valve 106, a linear solenoid valve 107, and a linear solenoid valve 122 are applied as a hydraulic mechanism of the first clutch 31. The pressure reducing valve 106, the linear solenoid valve 107, and the linear solenoid valve 122 have the same structures as those of the pressure reducing valve 6, the linear solenoid valve 7, and the linear solenoid valve 122 of the second brake 22.

The drum 91 is supported by the transmission case 2 to be rotatable about a center axis of the automatic transmission 1. The drum 91 includes a circular plate part 910 extending in the Y directions, an outer cylindrical part 911 extending from a radially outer edge of the circular plate part 910 and having a larger diameter than the circular plate part 910, and an inner cylindrical part 912 coaxially disposed on the inner side of the outer cylindrical part 911. The inner cylindrical part 912 is formed with a first supply port 913 and a second supply port 914 for a hydraulic pressure supply.

The piston 92 is a member corresponding to the piston 31p illustrated in FIG. 1, and includes a pressure receiving part 921, a small cylindrical part 922, and a large cylindrical part 923. The pressure receiving part 921 has a first surface 92A on the friction plate unit 105 side and a second surface 92B on the opposite side from the first surface 92A, and the both surfaces receive hydraulic pressure. The pressure receiving part 921 includes a through-hole 924 penetrating in the axial directions, a pressure ball 925 is disposed inside the through-hole 924. An inner cylindrical part 926 projects from a radially inner edge of the pressure receiving part 921 and extends in the −X direction. The inner cylindrical part 926 is bored a third supply port 927 communicating with the second supply port 914. An edge of the large cylindrical part 923 on the −X side pushes the friction plate unit 105. The sealing ring 93 is disposed between the piston 92 and the friction plate unit 105 and blocks a gap between the large cylindrical part 923 and the inner cylindrical part 926.

The engaging hydraulic pressure chamber 94 (hydraulic oil pressure chamber) is space between (the second surface 92B side of) the pressure receiving part 921 of the piston 92 and the circular plate part 910 of the drum 91, and receives hydraulic pressure from a first oil path 174 through the first supply port 913. The disengaging hydraulic pressure chamber 95 (centrifugal balance hydraulic pressure chamber) is space defined by (the first surface 92A side of) the pressure receiving part 921 of the piston 92, the small and large cylindrical parts 922 and 923, and the sealing ring 93, and receives hydraulic pressure from a second oil path 175 through the second and third supply ports 914 and 927. A return spring 96 for elastically biasing the piston 92 in the +X direction is disposed inside the disengaging hydraulic pressure chamber 95. When causing the friction plate unit 105 to change from the disengaged state to the engaged state, hydraulic pressure is supplied from an output port 172 of the linear solenoid valve 107 to the engaging hydraulic pressure chamber 94 and the disengaging hydraulic pressure chamber 95 through the first oil path 174 and the second oil path 175 simultaneously.

Similar to the pressure reducing valve 6, the pressure reducing valve 106 is built in the second oil path 175 and adjusts the hydraulic pressure of the disengaging hydraulic pressure chamber 95 to be at or below a given value (a set pressure of the pressure reducing valve 106). The linear solenoid valve 122 is connected to a port b of the pressure reducing valve 106 via a third oil path 176.

Similar to the linear solenoid valve 120, the linear solenoid valve 122 is a hydraulic pressure (release pressure) control valve for supplying and discharging hydraulic pressure to and from a spring chamber of the pressure reducing valve 106. Thus, the linear solenoid valve 122 functions as a set pressure (release pressure) control valve for changing a set pressure (release pressure) of the pressure reducing valve 106. An input port 141 of the linear solenoid valve 122 receives hydraulic oil from the oil pump 81 (not illustrated). A spool (not illustrated) of the linear solenoid valve 122 operates in response to a power distribution to a coil thereof, and the operation of the spool causes the input port 141 and an output port 142 to communicate with each other when supplying the hydraulic pressure to the spring chamber of the pressure reducing valve 106, and causes the output port 142 and a drain port to communicate with each other when discharging the hydraulic pressure. The linear solenoid valve 122 also adjusts an amount of hydraulic oil discharged from the output port 142 based on a control of the power distribution amount to the coil.

Note that a hydraulic pressure sensor (not illustrated) for detecting the pressure of the hydraulic oil is attached to the first oil path 174. Similar to the hydraulic pressure sensor 116 attached to the first oil path 74 of the second brake 22, the hydraulic pressure information is inputted into the control unit 100. Further, the oil temperature information is inputted into the control unit 100 from the oil temperature sensor 115 attached in the oil pan of the automatic transmission 1 as described above.

The first surface 92A of the piston 92 receives hydraulic pressure from the disengaging hydraulic pressure chamber 95 and the second surface 92B receives hydraulic pressure from the engaging hydraulic pressure chamber 94. Here, a pressure receiving area of the second surface 92B of the piston 92 is set larger than a pressure receiving area of the first surface 92A. The small cylindrical part 922 and the large cylindrical part 923 extend continuously to the pressure receiving part 921 in this order in the −X direction. Accordingly, the disengaging hydraulic pressure chamber 95 has a small volume section 95A on the +X side (inside of the small cylindrical part 922), and a large volume section 95B on the −X side (inside of the large cylindrical part 923). The first clutch 31 is required to have a function in the disengaging hydraulic pressure chamber 95 to cancel centrifugal hydraulic pressure of the engaging hydraulic pressure chamber 94.

The operation of the first clutch 31 having the above structure is the same as the operation of the second brake 22 described in the above embodiment. For example, when hydraulic pressure is supplied to the engaging hydraulic pressure chamber 94 and the disengaging hydraulic pressure chamber 95, the piston 92 moves in the −X direction (engaging direction) by a comparatively small pushing force produced based on a pressure receiving area difference between the first and second surfaces 92A and 92B. In an early stage of the engagement, the movement of the piston 92 based on the pressure receiving area difference continues for a certain period of time. Further, when the actual engaging pressure becomes a set pressure of the pressure reducing valve 106 or above, the pressure reducing valve 106 starts the pressure limiting operation (pressure reducing operation) to limit hydraulic pressure of the disengaging hydraulic pressure chamber 95 at the set pressure of the pressure reducing valve 106 and the second surface 92B of the piston 92 receives a large pushing force.

A hydraulic pressure control executed by the hydraulic pressure controller 83 to engage the first clutch 31 is described with reference to FIG. 18 which is a time chart corresponding to FIG. 5 (the time chart of the hydraulic control of the second brake 22). Note that FIG. 18 illustrates the engaging operation of the first clutch 31 and a disengaging operation of the second clutch 32 when shifting up from the second gear range to the third gear range.

Figure 18:
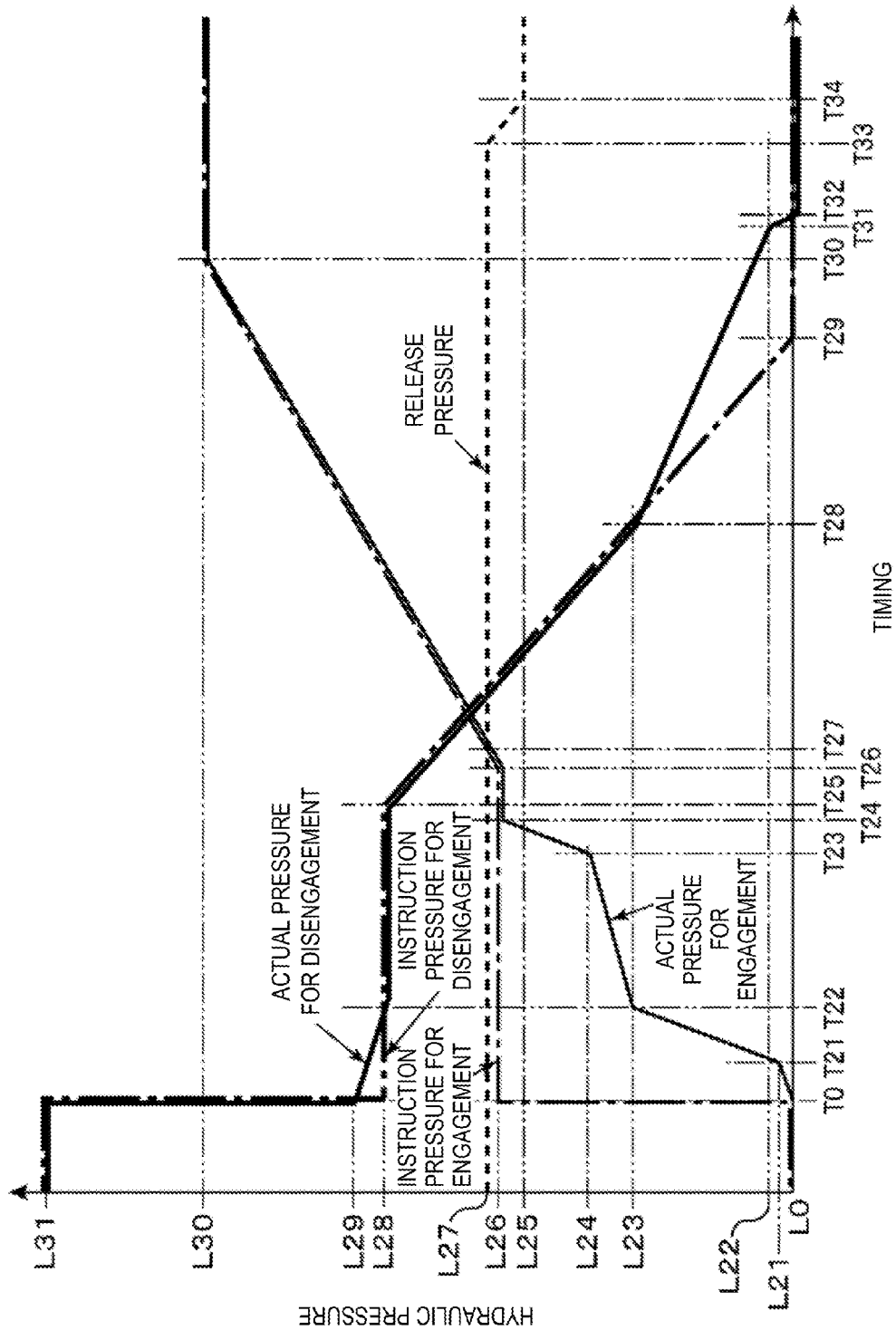
FIG. 18 is a time chart of a hydraulic pressure control executed by the hydraulic pressure controller to engage the first clutch of the automatic transmission.

As illustrated in FIG. 18, when a gear shift command is issued at a timing T0, the hydraulic pressure controller 83 instructs the linear solenoid valve 122 to keep the set pressure of the pressure reducing valve 106 at a hydraulic pressure level L27, and instructs the linear solenoid valve 107 to output the engaging pressure at a hydraulic pressure level L26. The instruction engaging pressure is kept at the hydraulic pressure level L26 for a first period from the timing T0 to a timing T26.

Similar to the above embodiment, the actual engaging pressures in the oil paths 174 and 175 extending to the frictional engageable element gradually increase from the timing T0 to a timing T21, and increase at a sharper inclination from the timing T21 to a timing T22. Then, the actual engaging pressures gradually increase from the timing T22 to a timing T23, and then increase at a sharper inclination from the timing T23 to a timing T24. From the timing T24 to the timing T26, the actual engaging pressure is substantially the same as the hydraulic pressure level L26.

Here, the hydraulic pressure level L26 is lower than the hydraulic pressure level L27 (which is the set pressure of the pressure reducing valve 106). Therefore, also in the engaging operation of the first clutch 31, in the first period from the timing T0 to the timing T26, the pressure reducing valve 106 does not perform the pressure limiting operation (pressure reducing operation) and the hydraulic pressures in the engaging hydraulic pressure chamber 94 and the disengaging hydraulic pressure chamber 95 become even.

Then, in a second period from the timing T26 to a timing T30, the hydraulic pressure controller 83 instructs the linear solenoid valve 107 to increase with time the engaging pressure from the hydraulic pressure level L26 to a hydraulic pressure level L30. Note that this pressure increase in the second period is also instructed to be performed gradually at a positive inclination from the timing T26 to the timing T30. At a timing T27 during the pressure increase, the instruction engaging pressure and the actual engaging pressure exceed the hydraulic pressure level L27. Thus, the hydraulic pressure of the disengaging hydraulic pressure chamber 95 is limited at the hydraulic pressure level L27, which causes a difference in pressure between the engaging hydraulic pressure chamber and the disengaging hydraulic pressure chamber.

The hydraulic pressure controller 83 instructs the linear solenoid valve 107 to keep the instruction engaging pressure at the hydraulic pressure level L30 after the timing T30.

On the other hand, when the gear shift command is issued at the timing T0, the hydraulic pressure controller 83 instructs the second clutch 32 to perform the disengaging operation. For example, the hydraulic pressure controller 83 instructs the linear solenoid valve 109 of the second clutch 32 to sharply drop the engaging pressure from a hydraulic pressure level L31 to a hydraulic pressure level L28. Further the hydraulic pressure controller 83 instructs the linear solenoid valve 109 of the second clutch 32 to keep the engaging pressure at the hydraulic pressure level L28 from the timing T0 to a timing T25.

Note that as illustrated in FIG. 18, an actual engaging pressure for the disengaging operation in each oil path to the second clutch 32 sharply drops to a hydraulic pressure level L29 at the timing T0 and then gradually drops from the hydraulic pressure level L29 to the hydraulic pressure level L29 until the timing T22. From the timing T22 to the timing T25, the actual engaging pressure is kept at the hydraulic pressure level L28, which is substantially matched with the instruction pressure for the disengaging operation.

The hydraulic pressure controller 83 outputs a pressure drop command to the linear solenoid valve 109 at the timing T25 which is later than the timing T24 and earlier than the timing T26. For example, the hydraulic pressure controller 83 instructs the linear solenoid valve 109 to gradually drop the engaging pressure from the hydraulic pressure level L28 to a hydraulic pressure level L0 from the timing T25 to a timing T29.

Note that the timing T29 is earlier than the timing T30. Further the instruction pressure in the disengaging operation becomes lower than the hydraulic pressure level L27 later than the timing T27 when the instruction pressure in the engaging operation exceeds the hydraulic pressure level L27.

Further, the actual engaging pressure in each oil path extending to the second clutch 32 gradually drops along the instruction engaging pressure from the timing T25 until a timing T28, and then further gradually drops to the hydraulic pressure level L22 from the timing T28 to a timing T31. After the timing T31, the actual engaging pressure sharply drops and reaches the hydraulic pressure level L0 at a timing T32. Thus, the operation of causing the second clutch 32 to change to the disengaged state and the first clutch 31 to the engaged state completes.

At a timing T33 which is after the second period in the engaging operation of the first clutch 31 (i.e., after the timing T30), the hydraulic pressure controller 83 instructs the linear solenoid valve 122 to drop the set pressure of the pressure reducing valve 106 toward a hydraulic pressure level L25. As illustrated in FIG. 18, the pressure drop from the timing T33 is instructed to be performed gradually until a timing T34. Further the hydraulic pressure controller 83 instructs the linear solenoid valve 122 to keep the set pressure of the pressure reducing valve 106 at the hydraulic pressure level L25 at the timing T34.

As described above, according to the automatic transmission 1 of this embodiment, also in the engaging operation of the first clutch 31, the piston 92 is moved by the pushing force based on the pressure receiving area difference between the first and second surfaces 92A and 92B of the piston 92. Further in the second period, the engaging hydraulic pressure chamber 94 and the disengaging hydraulic pressure chamber 95 are adjusted to have different pressures so as to secure a required pushing force (engaging force) of the piston 92. Therefore, the engaging shock is reduced without requiring a complicated hydraulic pressure control, and the engagement control time is shortened.

Further in the engaging operation of the first clutch 31, "pre-charging process" used in the art of WO2012/144207A1 is not provided. Therefore, the time of the engagement control is shortened and the control is simplified.

Also with the engagement control of the first clutch 31, from the timing T33 which is after the second period, the set pressure of the pressure reducing valve 106 is changed to the hydraulic pressure level L25. Therefore, the pushing force of the piston 92 on the friction plate unit 105 is increased after the completion of the engaging operation of the friction plate unit 105. The slip of the friction plate unit 105 is reduced also when a drive force of a high torque is inputted, for example.

Modifications

In the above embodiments, the planetary-gear-type automatic transmission is described as an example; however, the present invention is not limited to this. For example, the present invention may be applied to a Continuously Variable Transmission (CVT) and a Dual Clutch Transmission (DCT).

In the above embodiments, in the control of the engaging operation, the given instruction pressure is instructed to the hydraulic pressure control valve (linear solenoid valve) in the first period, and to keep it for the first period. Further the linearly increasing pressure is instructed to the hydraulic pressure control valve in the second period.

However, the present invention is not limited to this. For example, the instruction pressure in the first period may have an inclination, and the instruction pressure in the second period may increase with time in a quadratic or cubic curve manner. Note that, since the first and second periods are extremely short (e.g., 100 msec. to 600 msec.), keeping the first instruction pressure at the given value and chronologically linearly increasing the second instruction pressure is desirable in view of simplifying the control.

Further in the above embodiments, the automatic transmission which receives the drive force of the engine without using a torque converter (fluid transmitter) is described as an example; however, the present invention may be applied to an automatic transmission which receives the drive force of the engine through a torque converter.

Furthermore, the instruction engaging pressure in the first period is changed based on the hydraulic oil temperature in one example, and the instruction engaging pressure in the first period is changed based on the actual pressure of the hydraulic oil in another example; however, in the present invention, the instruction engaging pressure in the first period may be changed based on both the hydraulic oil temperature and the actual pressure of the hydraulic oil. Additionally, the mode for changing the instruction engaging pressure in the first period based on the instructed information (received information) from the driver etc., which is described as another example, may be used in combination.

Further, in the above embodiment, the set pressure (release pressure) of the pressure reducing valve is dropped with time as illustrated in FIG. 5 etc.; however, the present invention is not limited by this. For example, the set pressure may be dropped more sharply or in a stepwise fashion.

The present invention may adopt various other modes by suitably combining the above embodiments and the modifications.

In the third modification described using FIG. 14, as an example, the timing to drop the set pressure of the pressure reducing valve 6 to the hydraulic pressure level L6(3) is from the timing T8 to the timing T9.

However, in the present invention, the drop timing of the set pressure of the pressure reducing valve 6 is not limited to this. For example, the set pressure of the pressure reducing valve 6 may be dropped immediately before the end of the first period, immediately after the start of the second period, or during the second period, which allows an increase in the degree of freedom for the control while reducing the engaging shock.

Further in the fourth modification described using FIG. 15, when the accelerator opening reaches the threshold, the set pressure of the pressure reducing valve is dropped to increase the engaging force of the friction plate unit.

However, in the present invention, the changing manner of the set pressure of the pressure reducing valve according to the information of the accelerator opening is not limited to this. For example, in a situation where the vehicle resumed to a normal traveling state after a kickdown at the time of acceleration to overtake another vehicle, the set pressure of the pressure reducing valve may increase after being dropped once so as to reduce the pushing force against the friction plate unit. By such a control, when a high torque is no longer applied, the pushing force against the friction plate unit is reduced for a lesser mechanical load, which leads to reducing a mechanical fatigue and keeping a high mechanical reliability of the automatic transmission in the long term.

In the above embodiments and modifications, the supply and discharge of hydraulic pressure to and from the spring chamber of the pressure reducing valve is performed by the linear solenoid valve; however, in the present invention, the spring of the pressure reducing valve is not an essential component. In other words, the present invention may adopt a mechanism capable of controlling the set pressure (release pressure) of the pressure reducing valve simply with hydraulic pressure supplied from a linear solenoid valve.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Automatic Transmission
5, 105 Friction Plate Unit 6, 106 Pressure Reducing Valve
7, 107-110 Linear Solenoid Valve (Hydraulic Pressure Control Valve)
21 First Brake
22 Second Brake
26 Engaging Hydraulic Pressure Chamber
27 Disengaging Hydraulic Pressure Chamber
31 First Clutch
32 Second Clutch
33 Third Clutch
51 Drive Plate (Friction Plate)
52 Driven Plate (Friction Plate)
74, 174 First Oil Path
75, 175 Second Oil Path
76, 176 Third Oil Path
80 Hydraulic Mechanism
81 Oil Pump
82 Hydraulic Circuit
83 Hydraulic Pressure Controller
94 Hydraulic Oil Pressure Chamber (Engaging Hydraulic Pressure Chamber)
95 Centrifugal Balance Hydraulic Pressure Chamber (Disengaging Hydraulic Pressure Chamber)
100 Control Unit (Control Device)
116 Hydraulic Pressure Sensor
120-124 Linear Solenoid Valve (Release Pressure Control Valve)
243, 924 Through-hole
244, 925 Pressure Ball (Restricting Mechanism)

What is claimed is:

1. A method of controlling an automatic transmission, the automatic transmission including:
a piston having a first surface and a second surface opposite from each other in axial directions of the piston, and movable in the axial directions;
a plurality of friction plates disposed on the first surface side of the piston;
an engaging hydraulic pressure chamber for supplying hydraulic pressure to the second surface of the piston and directing the piston to an engaging position to push the friction plates to be engaged with each other in an engaged state;
a disengaging hydraulic pressure chamber for supplying hydraulic pressure to the first surface of the piston and directing the piston to a disengaging position to cause the friction plates to be in a disengaged state;
a hydraulic pressure control valve having an output port of hydraulic pressure, and for supplying and discharging hydraulic pressure to and from the engaging hydraulic pressure chamber and the disengaging hydraulic pressure chamber;
a first oil path communicating the output port of the hydraulic pressure control valve with the engaging hydraulic pressure chamber;
a second oil path communicating the output port with the disengaging hydraulic pressure chamber; and
a pressure reducing valve disposed in the second oil path and for preventing hydraulic pressure of the disengaging hydraulic pressure chamber from exceeding a given set pressure, the second surface of the piston having a larger area for receiving hydraulic pressure than an area of the first surface of the piston for receiving hydraulic pressure,
the method comprising changing the given set pressure according to information regarding a state of the automatic transmission.

2. The method of claim 1, wherein
the information regarding the state of the automatic transmission includes information of a gear range, and
the given set pressure of the pressure reducing valve is changed according to the information of the gear range.

3. The method of claim 2, comprising controlling the friction plates to change from the disengaged state to the engaged state in response to a gear shift command, wherein
the controlling of the friction plates includes controlling the hydraulic pressure control valve to:
adjust the hydraulic pressure to a first instruction pressure in a first period in response to the gear shift command; and
adjust the hydraulic pressure to a second instruction pressure in a second period directly following the first period, a change of the second instruction pressure being larger than a change of the first instruction pressure.

4. The method of claim 3, wherein
in the first and second periods, the given set pressure of the pressure reducing valve is set to a first set pressure that is higher than the first instruction pressure, and
after adjusting the hydraulic pressure to the second instruction pressure, the given set pressure is changed to a second set pressure that is lower than the first set pressure.

5. The method of claim 4, wherein the first instruction pressure in the first period is a given fixed value.

6. The method of claim 5, wherein the second instruction pressure increases with time from the given fixed value at the start of the second period to a value of hydraulic pressure that causes the friction plates to be in the engaged state at the end of the second period.

7. The method of claim 6, wherein the piston is formed with a through-hole communicating the engaging hydraulic pressure chamber with the disengaging hydraulic pressure chamber.

8. The method of claim 7, wherein a restricting mechanism for restricting an oil flow from the engaging hydraulic pressure chamber to the disengaging hydraulic pressure chamber is disposed in the through-hole.

9. The method of claim 1, comprising controlling the friction plates to change from the disengaged state to the engaged state in response to a gear shift command, wherein
the controlling of the friction plates includes controlling the hydraulic pressure control valve to:
adjust the hydraulic pressure to a first instruction pressure in a first period in response to the gear shift command; and
adjust the hydraulic pressure to a second instruction pressure in a second period directly following the first period, a change of the second instruction pressure being larger than a change of the first instruction pressure.

10. The method of claim 9, wherein
in the first and second periods, the given set pressure of the pressure reducing valve is set to a first set pressure that is higher than the first instruction pressure, and
after adjusting the hydraulic pressure to the second instruction pressure, the given set pressure is changed to a second set pressure that is lower than the first set pressure.

11. The method of claim 10, wherein the first instruction pressure in the first period is a given fixed value.

12. The method of claim 11, wherein the second instruction pressure increases with time from the given fixed value at the start of the second period to a value of hydraulic pressure that causes the friction plates to be the engaged state at the end of the second period.

13. The method of claim 12, wherein the piston is formed with a through-hole communicating the engaging hydraulic pressure chamber with the disengaging hydraulic pressure chamber.

14. The method of claim 13, wherein a restricting mechanism for restricting an oil flow from the engaging hydraulic pressure chamber to the disengaging hydraulic pressure chamber is disposed in the through-hole.

15. The method of claim 1, wherein
the information regarding the state of the automatic transmission includes information of an accelerator opening, and
the given set pressure of the pressure reducing valve is changed according to the information of the accelerator opening.

16. The method of claim 15, wherein the piston is formed with a through-hole communicating the engaging hydraulic pressure chamber with the disengaging hydraulic pressure chamber.

17. The method of claim 16, wherein a restricting mechanism for restricting an oil flow from the engaging hydraulic pressure chamber to the disengaging hydraulic pressure chamber is disposed in the through-hole.

18. The method of claim 1, wherein the piston is formed with a through-hole communicating the engaging hydraulic pressure chamber with the disengaging hydraulic pressure chamber.

19. The method of claim 18, wherein a restricting mechanism for restricting an oil flow from the engaging hydraulic pressure chamber to the disengaging hydraulic pressure chamber is disposed in the through-hole.

20. A control device of an automatic transmission, the automatic transmission including:
a piston having a first surface and a second surface opposite from each other in axial directions of the piston, and movable in the axial directions;
a plurality of friction plates disposed on the first surface side of the piston;
an engaging hydraulic pressure chamber for supplying hydraulic pressure to the second surface of the piston and directing the piston to an engaging position to push the friction plates to be engaged with each other;
a disengaging hydraulic pressure chamber for supplying hydraulic pressure to the first surface of the piston and directing the piston to a disengaging position to cause the friction plates to be in a disengaged state;
a hydraulic pressure control valve having an output port of hydraulic pressure and for supplying and discharging hydraulic pressure to and from the engaging hydraulic pressure chamber and the disengaging hydraulic pressure chamber;
a first oil path communicating the output port of the hydraulic pressure control valve with the engaging hydraulic pressure chamber;
a second oil path communicating the output port with the disengaging hydraulic pressure chamber; and
a pressure reducing valve disposed in the second oil path and for preventing hydraulic pressure of the disengaging hydraulic pressure chamber from exceeding a given set pressure, the second surface of the piston having a larger area for receiving hydraulic pressure than an area of the first surface of the piston for receiving hydraulic pressure,
the control device including a processor configured to execute instructions to change the given set pressure according to information regarding a state of the automatic transmission.

* * * * *